US007673031B1

(12) United States Patent
Jalagam et al.

(10) Patent No.: US 7,673,031 B1
(45) Date of Patent: Mar. 2, 2010

(54) RESOURCE MAPPING IN A NETWORK ENVIRONMENT

(75) Inventors: Sesh Jalagam, Santa Clara, CA (US); Yan Zheng, San Jose, CA (US); Sharon Yuet Mei Lam, Saratoga, CA (US); Alan Kin Chung Leung, Fremont, CA (US)

(73) Assignee: EMC Corporation, Hopkinton, MA (US)

( * ) Notice: Subject to any disclaimer, the term of this patent is extended or adjusted under 35 U.S.C. 154(b) by 404 days.

(21) Appl. No.: 11/640,599

(22) Filed: Dec. 18, 2006

(51) Int. Cl.
*G06F 15/173* (2006.01)
(52) U.S. Cl. .................. 709/223; 709/224
(58) Field of Classification Search .......... 709/220–226
See application file for complete search history.

(56) References Cited

U.S. PATENT DOCUMENTS

| | | | | |
|---|---|---|---|---|
| 5,675,831 | A * | 10/1997 | Caputo ......................... | 710/10 |
| 6,389,432 | B1 * | 5/2002 | Pothapragada et al. ...... | 707/205 |
| 6,640,278 | B1 * | 10/2003 | Nolan et al. .................. | 711/6 |
| 6,920,494 | B2 * | 7/2005 | Heitman et al. ............. | 709/223 |
| 7,114,020 | B1 * | 9/2006 | Smart et al. ................. | 710/104 |
| 7,203,730 | B1 * | 4/2007 | Meyer et al. ................. | 709/213 |
| 7,216,157 | B1 * | 5/2007 | Liu et al. ..................... | 709/223 |
| 7,403,987 | B1 * | 7/2008 | Marinelli et al. ............ | 709/223 |
| 2002/0162010 | A1 * | 10/2002 | Allen et al. .................. | 713/200 |
| 2003/0097438 | A1 * | 5/2003 | Bearden et al. ............. | 709/224 |
| 2003/0182422 | A1 * | 9/2003 | Bradshaw et al. ........... | 709/225 |
| 2004/0078787 | A1 * | 4/2004 | Borek et al. ................. | 717/136 |
| 2006/0095885 | A1 * | 5/2006 | Agrawal et al. .............. | 716/12 |

* cited by examiner

*Primary Examiner*—Neveen Abel Jalil
*Assistant Examiner*—Daniel Kinsaul
(74) *Attorney, Agent, or Firm*—Chapin IP Law, LLC

(57) ABSTRACT

If retrieved information from a storage area network resource does not enable simple and direct mapping of the respective unknown type of storage area network resource to a known type of storage area network resource with sufficient certainty (because the collection of data does not match any known unique groupings of data associated with known types of resources), then a mapping function attempts to automatically map the storage area network resource to a respective known type of storage area network resource. For example, the mapping function attempts to identify the specific identity of the storage area network resource in question. After repeating a process of mapping and determining identities of one or more different resources in a storage area network environment, an advisory process applies a set of configuration rules to identify whether an arrangement of resources will work properly.

19 Claims, 10 Drawing Sheets

RESOURCE MAPPING IN A NETWORK ENVIRONMENT

RELATED APPLICATIONS

This application is related to U.S. patent application Ser. No. 11/640,600 "CONFIGURATION VALIDATION AND AMBIGUOUS MAPPING," filed on Dec. 18, 2006, the entire teachings of which are incorporated herein by this reference.

BACKGROUND

In general, a so-called storage area network (SAN) is a collection of data storage systems that are networked via a switching fabric to a number of host computer systems operating as servers. The host computers (also known as servers) of a respective storage area network access data stored in respective data storage systems on behalf of client computers that request data. For example, according to conventional techniques, upon receiving a storage access request, a respective host computer in a storage area network accesses a large repository of storage through a switching fabric on behalf of a corresponding requesting client. An access can include a read or write of data to storage.

Typically, many clients can access data through the same host computer or server. Thus, storage area networks enable multiple clients to access one or more shared storage systems through the same host computer. In many applications, storage area networks support hi-speed acquisitions of data so that the host servers are able to promptly retrieve and store data from the data storage system.

A respective infrastructure supporting access to data in a storage area network can be quite complex. For example, as discussed above, consider the number of hardware and software components that must work in harmony in order for a user to successfully access data stored in a storage array of a SAN. To access such data, a user application provides file system calls or requests (e.g., open, read, write and so forth) to a file system resource presented to the user application by an operating system executing on the host computer system. The file system receives the file system calls and operates to map such file system calls to a series of I/O requests. The operating system on the host computer system transmits the I/O requests through a host interface device resource, such as an interface card (e.g., SCSI or FibreChannel adapter) having one or more I/O port resources, across an interface cable or networking medium of one or more switches (e.g., in a storage area network implementation) to a front-end adapter interface card resource operating on a high-capacity data storage array of the SAN. The front-end adapter interface card receives the I/O requests and interprets them to identify appropriate data locations within specific storage device resources contained in the storage array.

After the requested data is accessed from the storage devices, respective I/O responses are typically returned from the accessed storage system to the user application along an information or data flow path (based on operations and processing functionality provided by each of the aforementioned components and resources) in a reverse direction back to the application on the host computer running the client application. In this way, access to data in a conventional storage area network involves reliance on a proper operation and coordination of a multitude of software and hardware resources in a storage area network to retrieve data from storage and serve the data to a client.

If even a single resource such as a switch, operating system, host bus adapter, storage system, etc. in a respective storage area network is incompatible with other hardware and/or software resources present in the storage area network, then the storage area network may no longer operate properly and enable a respective user to retrieve stored data.

One conventional way to ensure that a storage area network will work properly (e.g., so that the storage area network enables users to access corresponding stored data) is to generate a set of interoperability rules indicating valid storage area network configurations and store the interoperability rules in a database. In general, the set of interoperability rules indicates which combination of different types of hardware and software resources are compatible with each other and can be used together in a respective storage area network. An administrator can manually review (e.g., apply) respective interoperability rules with respect to a current or proposed storage area network configuration to ensure that a respective configuration is acceptable prior to actual implementation. To apply such rules, the network administrator needs to know a type associated with each of the resources in the storage area network environment. After identifying a type associated with each of multiple proposed resources in a respective storage area network environment, application of a set of rules provides notification of which resources are incompatible.

SUMMARY

Conventional applications that support management of a storage area network environment can suffer from a number of deficiencies. For example, as discussed above, management of a storage area network can be a challenge due to the complex network of resources that must be combined so that the storage area network operates properly for a multitude of different types of users. Application of a set of rules to validate a storage area network configuration requires proper knowledge of the types (i.e., identities) of resources in the storage area network. Unfortunately, a storage area network can include so many different types (e.g., manufacturer, model, hardware settings, software settings, etc.) of resources that it is often difficult to keep track of such information (e.g., resource types) and therefore render an assessment whether a respective storage area network configuration is acceptable.

One way to learn of a "type" or "specific identity" associated with a respective storage area network resource is to communicate directly with the respective storage area network. In certain cases, response information originated by the respective storage area network resource can be used to confidently map the respective storage area network resource to a known type of storage area network resource. However, in many cases, the response information (e.g., collected data) received from a respective storage area network resource does not always include enough information to map the respective storage area network resource to a corresponding known type of storage area network resource with sufficient certainty. In addition to not including enough information to aid in mapping the resource to a specific identity, the collection of data received from the storage area network resource may include extraneous data that is not useful for mapping purposes.

Techniques discussed herein deviate with respect to conventional applications such as those discussed above as well as other techniques known in the prior art. For example, embodiments herein include techniques for mapping unknown types of storage area network resources (or resources having unknown identities) to corresponding known types (e.g., specific identities) of storage area network resources.

More specifically, a mapping function according to an embodiment herein can initially attempts to map (e.g., via so-called global mapping or mapping according to user defined terms) a respective unknown storage area network resource directly to a known type (e.g., to a specific identity) of storage area network resource based merely on information retrieved from or associated with the unknown type of storage area network resource. The received data can indicate vendor information and model information associated with the unknown type of storage area network resource. The mapping function initially attempts to match the unknown type of storage area network resource to a known type of storage area network resource based on the received data.

If the retrieved information does not enable simple and direct mapping of the respective unknown type of storage area network resource to a known type of storage area network resource with sufficient certainty (because the collection of data does not match any known unique groupings of data associated with known types of resources), then the mapping function as further discussed herein attempts (using best efforts) to automatically map the storage area network resource to a respective known type of storage area network resource. In other words, the mapping functions herein attempt to identify the specific identity of the storage area network resource in question. After determining identities of different resources in a storage area network environment, an advisory process applies a set of configuration rules to identify whether an arrangement of the resources will work properly in a storage area network environment.

In an example embodiment, one or more mapping functions as described herein attempt to deduce a type associated with originally unknown types of storage area network resource based on specific information received from a respective storage area network resource. More specifically, a collection function can initiate communications with each of multiple storage area network resources. The storage area network resources each provide one or more strings of character (identifier) information including data such as a vendor, model, version, etc. associated with the respective storage area network resource. Because there is no standard format used by all vendors to provide specific identity information associated with the resources, it can be difficult to match the resources with their respective actual identities. The mapping functions utilize a best efforts approach to assign a specific identity to a corresponding storage area network resource.

In one embodiment, the mapping function modifies the data collected from the storage area network resource to remove extraneous data that is not particularly useful for mapping purposes. For example, the mapping function can receive a character string of data originated by the resource. Such collected data can include at least a portion of data reflecting a classification or identification of the resource as well as other data that does not provide any indication of the resource's specific identity. In one embodiment, the mapping function modifies the collection of data (e.g., one or more character strings of information) received from the resource by removing at least a portion of data from the received data to produce a filtered set of data. In other words, the mapping function removes specific portions of data received from the resource to eliminate extraneous portions of data that are not useful for mapping purposes. The mapping function then uses the filtered set of data (e.g., modified set of collected data) to identify the specific identity of the resource.

As mentioned above, removal of (e.g., cleaning up) data from the one or more strings of information received from the unknown types of resources in a storage area network environment can include application of filters. In one embodiment, the mapping functions herein maintain one or more filters for selectively applying to the one or more strings of information to produce the modified collection of data. The one or more filters can include "exclude" type filters in which a respective filter pattern identifies which portion of data to remove from the originally received data strings. In addition to the exclude type filters, the mapping function can maintain "include" type filters that can be applied to identify which portion of data to save from the originally received data strings for mapping purposes.

Thus, application of the filters and corresponding removal of data can include detecting that a first portion of data collected from the resource matches a pattern associated with a first filter of multiple filters; in response to the matching, applying the first filter to remove a first data portion from the collection of data; detecting that a second portion of the collection of data matches a pattern associated with a second filter of the multiple filters; in response to the matching, applying the second filter to remove a second data portion from the collection of data.

In further embodiments, after so-called "clean up" of the one or more strings of information, the mapping function initiates application of a reverse lookup function to the modified collection of data (e.g., cleaned up data strings) to attempt to identify the specific identity associated with the resource. Application of the reverse lookup function can include verifying whether character string information associated with a known specific identity of a given storage area network resource matches any portion of the modified collection of data. For example, the mapping function identifies whether the modified collection of data or portion thereof matches a given pattern. If so, the mapping function applies a corresponding algorithm to attempt to match the resource to a qualified or known resource type that has been pre-tested for possible use in combination with other resources in the storage area network environment. The mapping function can repeat this compare process for each of a number of different patterns to apply corresponding matching algorithms. The different patterns act as a filter for deciding which corresponding algorithms to apply to the modified collection of data (e.g., cleaned data).

In addition to the above-mentioned reverse lookup technique, the mapping function can apply a so-called matching service algorithm attempt to identify a specific identity or multiple possible identities associated with each of multiple unknown types of resources. The matching service can be applied such as when the reverse lookup fails to provide a mapping of an unknown resource to a known resource type.

As an example, the matching service can entail parsing the modified collection of data into one or more portions and thereafter matching one or more portions of the modified collection of data with a set of character string information associated with corresponding known vendor types, model types, etc. of resources to identify a vendor type, model type, etc. associated with the resource.

In certain cases, the corresponding data string associated with an unknown resource may map to multiple resources such as those of two different vendor types. In other words, two different vendors may apply their own brand name to a common resource obtained from a third party. The information received from the resource may indicate only the model number assigned to the resource. The mapping function may not be able to identify which of the two vendors provided the resource. However, the mapping function can provide notification of multiple possible specific identities of resources in which the unknown resource may match but for which it is not actually known which specific identity in the class the resource actually matches. Again, this is an example of a mapping of an unknown resource to multiple possible resources.

Accordingly, embodiments herein includes, via use of the modified collection of data, mapping a corresponding resource to a class including multiple possible specific identities of resources in which the resource may match but for which it is not specifically known which specific identity in the class the resource actually matches. A source such as a user can pick which of the multiple possible identities to which the resource under test (e.g., not yet mapped storage area network resource) actually matches.

In addition to the embodiments discussed above, other embodiments herein include a computerized device (e.g., a host computer, workstation, etc.) configured to support the techniques disclosed herein such as resource mapping of unknown types of storage area network resource to known types of storage area network resources in a respective storage area network environment. In such embodiments, the computerized device such as a mapping system includes a memory system, a processor (e.g., a processing device), a respective display, and an interconnect connecting the processor and the memory system. The interconnect can support communications with the respective display (e.g., display screen or display medium). The memory system is encoded with an application that, when executed on the processor, generates a mapping function process according to techniques herein.

Yet other embodiments of the present disclosure include software programs to perform the method embodiment and operations summarized above and disclosed in detail below in the Detailed Description section of this disclosure. More specifically, one embodiment herein includes a computer program product (e.g., a computer-readable medium). The computer program product includes computer program logic (e.g., software instructions) encoded thereon. Such computer instructions can be executed on a computerized device to support mapping according to embodiments herein. For example, the computer program logic, when executed on at least one processor associated with a computing system, causes the processor to perform the operations (e.g., the methods) indicated herein as embodiments of the present disclosure. Such arrangements as further disclosed herein are typically provided as software, code and/or other data structures arranged or encoded on a computer readable medium such as an optical medium (e.g., CD-ROM), floppy or hard disk, or other medium such as firmware or microcode in one or more ROM or RAM or PROM chips or as an Application Specific Integrated Circuit (ASIC). The software or firmware or other such configurations can be installed on a computerized device to cause one or more processors in the computerized device to perform the techniques explained herein.

Yet another more particular technique of the present disclosure is directed to a computer program product that includes a computer readable medium having instructions stored thereon for executing mapping functions according to embodiments herein. The instructions, when carried out by a processor of a respective computer device, cause the processor to perform the steps of: i) receiving a collection of data associated with a resource in a storage area network environment; ii) modifying the collection of data; and iii) identifying the specific identity of the resource based on utilization of the modified collection of data. Other embodiments of the present application include software programs to perform any of the method embodiment steps and operations summarized above and disclosed in detail below.

It is to be understood that the system of the present application can be embodied solely as a software program, or as a software program operating in conjunction with corresponding hardware. For example, embodiments of the present application may be implemented in EMC's Control Center (ECC) software application that provides graphical management and advisory functionality of storage area network resources. Embodiments of the present application may also be implemented in computer devices that operate in connection with the Control Center (ECC) software. Control Center software is manufactured by EMC Corporation of Hopkinton, Mass., USA.

As discussed above, techniques herein are well suited for use in mapping and/or classifying resources in a respective storage area network environment. However, it should be noted that embodiments herein are not limited to use in such applications and that the techniques discussed herein are well suited for other applications as well. Note that each of the different features, techniques, configurations, etc. discussed herein can be executed independently or in combination. Accordingly, the present invention can be embodied and viewed in many different ways.

Also, note that this summary does not specify every embodiment and/or incrementally novel aspect of the present disclosure or claimed invention. Instead, this summary only provides a preliminary discussion of different embodiments and corresponding points of novelty over conventional techniques. For additional details and/or possible perspectives (permutations) of the invention, the reader is directed to the Detailed Description section and corresponding figures of the present disclosure.

BRIEF DESCRIPTION OF THE DRAWINGS

The foregoing and other objects, features, and advantages of the present application will be apparent from the following more particular description of preferred embodiments of the present disclosure, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to one embodiment, a mapping function initially attempts to map (e.g., via so-called global mapping or mapping according to user defined terms) a respective unknown storage area network resource directly to a known type (e.g., to a specific identity) of storage area network resource based merely on information retrieved from or associated with the unknown type of storage area network resource. The received data can indicate vendor information and model information associated with the unknown type of storage area network resource.

If the retrieved information does not enable simple and direct mapping of the respective unknown type of storage area network resource to a known type of storage area network resource with sufficient certainty (because the collection of data does not match any known unique groupings of data associated with known types of resources), then the mapping function as further discussed herein attempts to automatically map the storage area network resource to a respective known type of storage area network resource. In other words, the mapping functions herein deduce or attempt to identify the specific identity of the storage area network resource in question. After determining identities of different resources in a storage area network environment, an advisory process applies a set of configuration rules to identify whether an arrangement of known types of resources will work properly.

Figure 1:
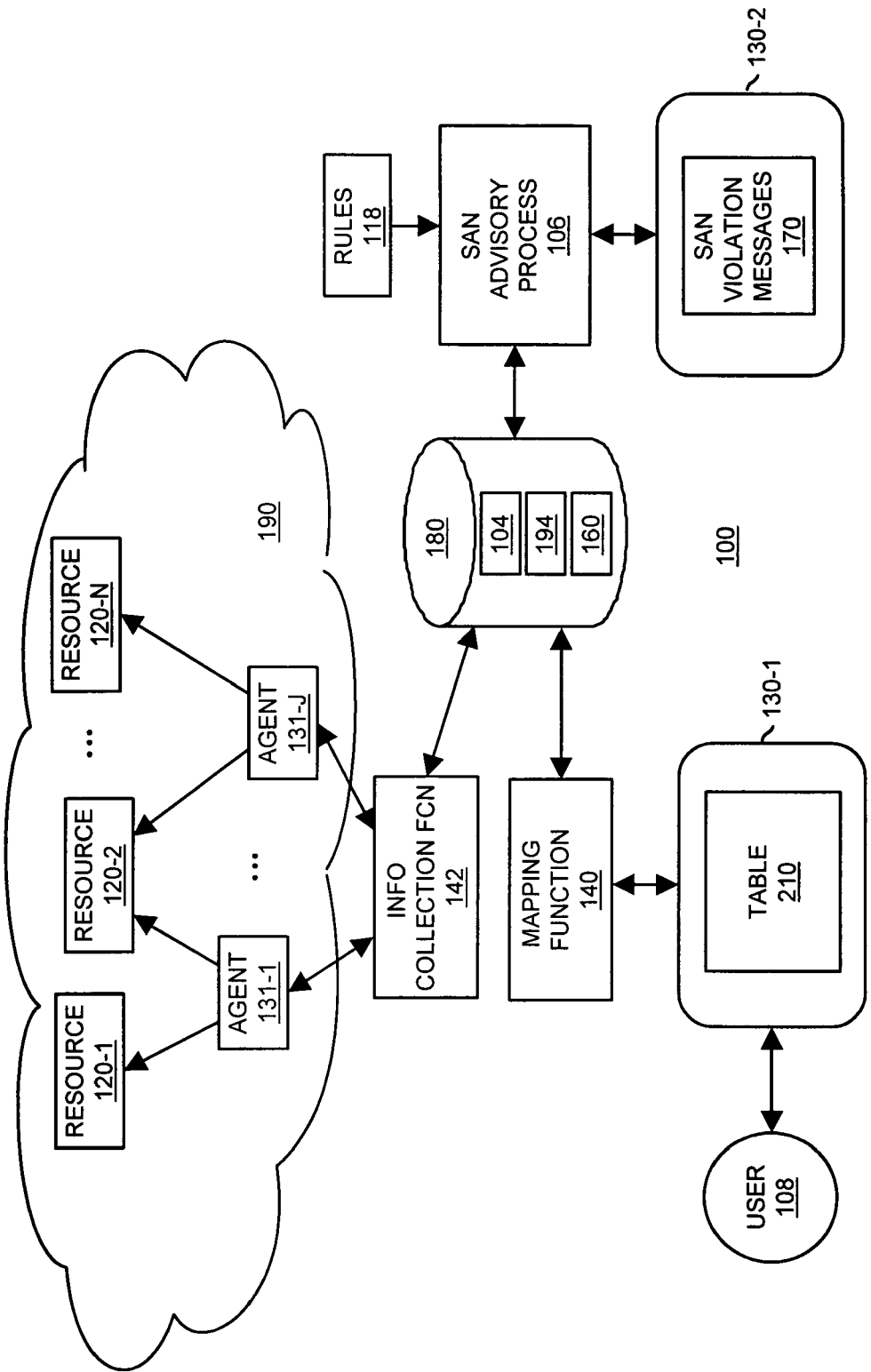
FIG. 1 is a diagram illustrating an environment for mapping resources according to embodiments herein.

FIG. 1 is a block diagram of a storage area network environment 100 according to an embodiment herein. As shown, storage area network environment 100 includes storage area network 190, information collection function 142, mapping function 140, display screen 130 (e.g., display screen 130-1 and display screen 130-2), user 108, repository 180, SAN advisory process 106, and rules 118. Storage area network 190 includes agents 131 (e.g., agent 131-1, . . . , agent 131-J), and resources 120 (e.g., resource 120-1, resource 120-2, . . . , resource 120-N). Display screen 130-1 (e.g., screenshot of display screen 130 at time T1) displays mapped resource information 160 via table 210. Display screen 130-2 (e.g., a screenshot of display screen 130 at time T2, which is later than time T1) displays storage area network violation messages 170.

In one embodiment, repository 180 stores configuration information 104 such as data received from each of the resources 120. The strings of data received from the resources and stored in repository 180 can include information such as vendor, model, version, etc. associated with a respective storage area network resource 120.

Information can be retrieved from the resources 120 in a number of ways. For example, agents 131 can be configured to communicate with storage area network resources 120 to learn of respective configuration and settings information associated with the respective storage area network resources 120. Information collection function 142 initiates storage of the retrieved information in repository 180.

The retrieved information (e.g., strings of data including data such as configuration and settings information) from the storage area network resources 120 do not always specify actual types associated with the storage area network resources 120. For example, based on respective queries, a respective storage area network resource 120-1 (e.g., a host or server) may provide vendor and model information indicating that a respective storage area network resource 120-1 is a Solaris™ 2.9 operating system. The actual type associated with storage area network resource 120-1 can be one of multiple types of different Solaris™ operating systems such as Solaris™ version 8 or Solaris™ version 9, etc. as would be understood by rules 118. In other words, receipt of information such as "Solaris 2.9" is not a specific enough description as it can indicate one of many different types, versions, or species of operating systems.

Prior to application of rules 118 (that indicate whether certain types of resources present in the storage area network environment 190 are compatible for use) and generation of SAN violation messages 170, mapping function 140 performs a process of mapping (or at least attempting to map) each of one or more storage area network resources 120 to a respective one or more species or known types of storage area network resources. Mapping the storage area network resources 120 in storage area network 190 to corresponding identities based on a set of standards or guidelines ensures that SAN violation messages 170 (as generated by application of rules 118) accurately indicate occurrences of incompatible resources. As will be discussed later in this specification, rules indicate which types of resources are compatible for use in storage area network environment 100.

In one embodiment, information collection function 142 communicates with agents 131 and stores corresponding information associated with the storage area network resource 120 as configuration information 104 in repository 180. Mapping function 140 utilizes the configuration information 104 in repository 180 to generate an actual mapping (or a possible mapping) of unknown types of storage area network resources to corresponding known types of storage area network resources. In other words, mapping function 140 assigns or attempts to assign each unknown type of storage area network resource to a corresponding known type of storage area network resource. Such a process can include presenting mapped resource information 160 on display screen 130-1 for viewing by a respective user 108 as table 210.

In the context of a general embodiment herein, after a best effort attempt to match resources 120 to corresponding specific identities and possible input provided by the user, SAN advisory process 106 applies rules 118 to (storage area network) configuration information 104 for purposes of generating and displaying storage area network violation messages 170 on display screen 130-2 for viewing by a respective user 108. Accordingly, a respective user 108 can correct any incompatibility issues associated with resources in the storage area network environment 100.

Rules 118 specify which specific types of storage area network resources 120 are compatible or incompatible with each other. As previously discussed, keeping track of a specific type associated with each of many storage area network resources can be a challenge. Prior to executing SAN advisory process 106, a respective user 108 initiates execution of mapping function 140 to assign appropriate identifier values or types to each of storage area network resources 120.

Figure 2:
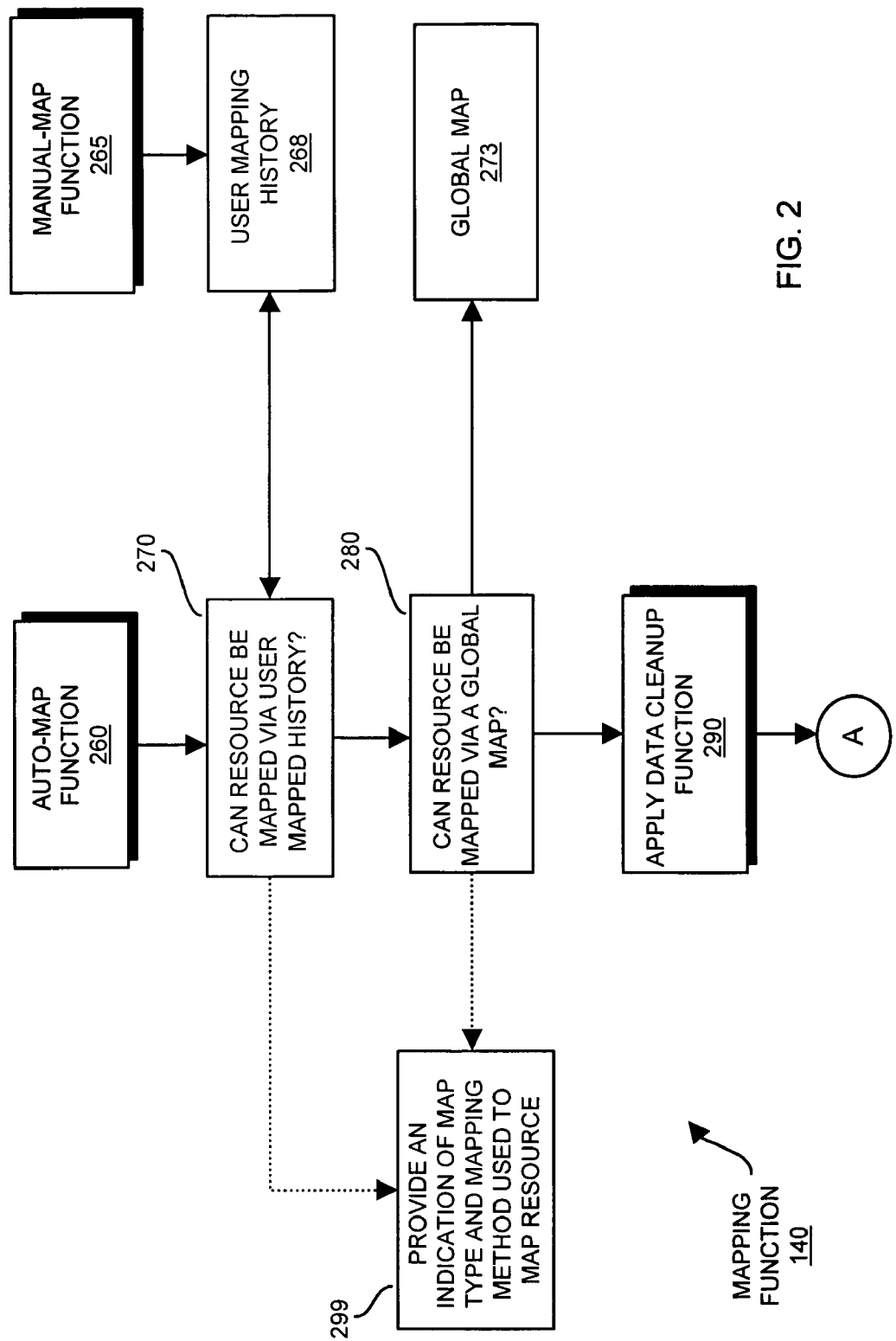
FIGS. 2 and 3 is a diagram/flowchart illustrating mapping of resources according to embodiments herein.
Figure 3:
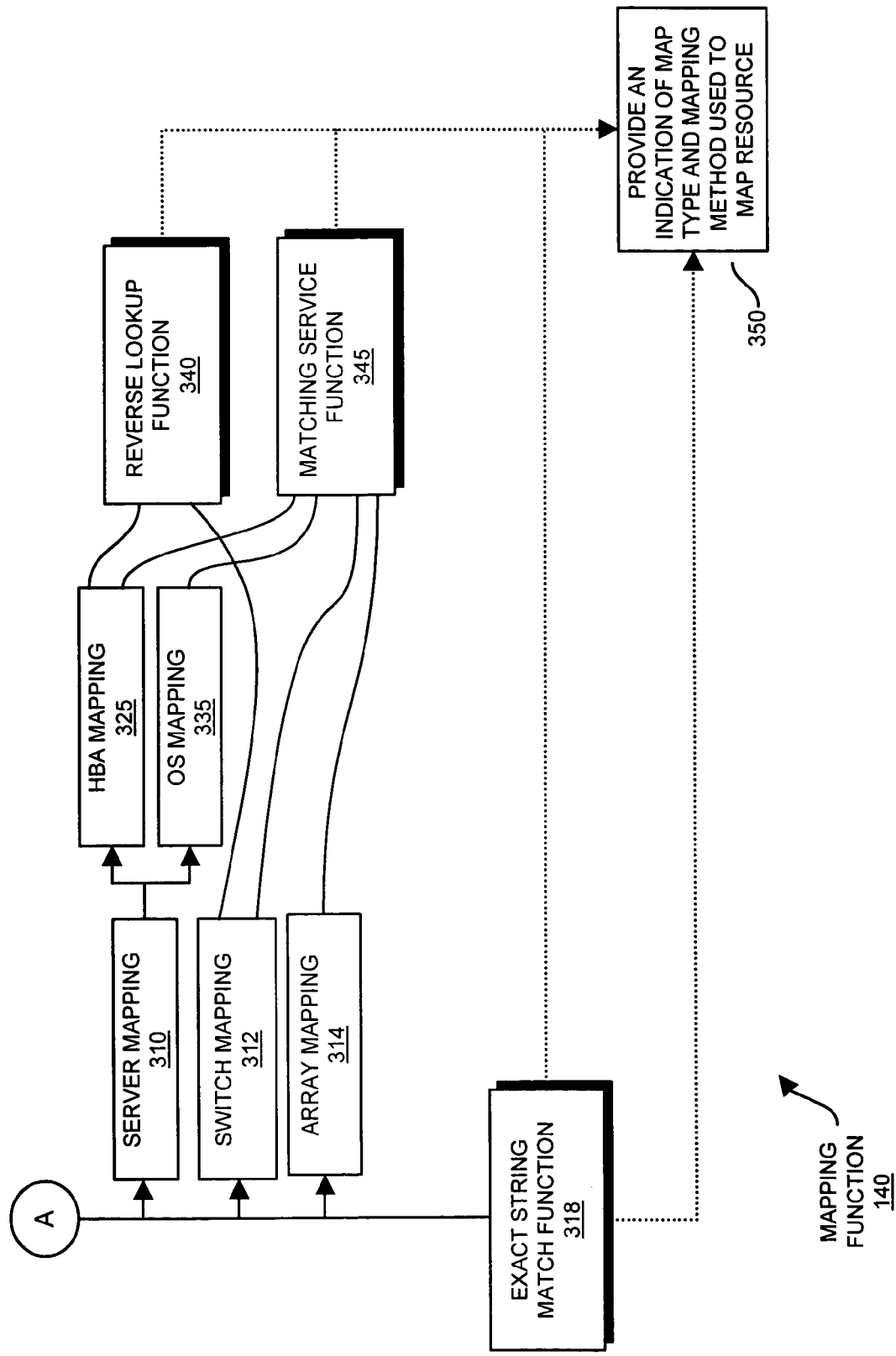

FIGS. 2 and 3 is a diagram/flowchart illustrating mapping of resources according to embodiments herein. As previously discussed, the Auto-Mapping function (or Auto-Matching function) includes a process of mapping the collected values from different resources 120 to one or more qualified identities (e.g., known types of resources). This information can be stored in a definition file indicating a mapping (e.g., map state) of each of resources 120 to a corresponding identifier value.

Embodiments herein support mapping to a number of different map states. For example, a resource may not map to any known specific identity. In this case, the resource is assigned a value of −1 and/or MAPPED_NONE. This state merely indicates that the component is not mapped.

Additionally, a resource may map to one specific identity (e.g., a single resource type). In this case, the resource is assigned a value of 0 and/or MAPPED_ONE. This state means the item is mapped to a single component type.

A resource may map to multiple specific identities (e.g., multiple possible resource types). In this case, the resource is assigned a value of 1 and/or MAPPED_MULTIPLE. A component (e.g., resource 120) is said to be mapped to multiple components when there are more than one component that correspond to collected data from the customer (e.g., resource 120) and it is ambiguous as to which one of multiple components the resource happens to match.

A resource may map to an identity known not to be present in a listing of qualified, tested, or supported storage area network resources. In this case, the resource is assigned a value of 2 and/or MAPPED_NOT_LISTED. A Component that is known not to be in qualified (e.g., tested) listing of resources is considered "Not Listed."

A resource may be infrastructure software which is assigned a value of 3 and/or MAPPED_NOT_INSTALLED. At times, a component is merely not installed. This can be the case with Infrastructure Software like PowerPath. The user can set the Infrastructure Software component to "Not Installed."

Accordingly, each resource 120 can be assigned one of the following map types: MAPPED_NONE, MAPPED_ONE, MAPPED_MULTIPLE, MAPPED_NOT_LISTED, MAPPED_NOT_INSTALLED, or MAPPED_NOT_LISTED.

In addition to identifying map types, the definition file can include information indicating a corresponding method that was used to produce a respective mapping. The following table lists the possible types of mapping methods used to map a given resource 120 to a corresponding identity.

In one embodiment, the manual map function 265 enables a respective user 108 to manually map a given resource in the storage area network environment 100 to a specific identity. Manual mapping of one or more resources results in generation of user mapping history 268. Mapping function 140 updates user mapping history 268 each time a user manually maps a resource 120 to a corresponding known resource type. The user mapping history 268 can be used for future mappings as will be discussed.

Now, referring to FIG. 2, the mapping function 140 initiates execution of auto-map function 260 for a given resource under test. In step 270, the auto-map function 260 checks whether a respective resource can be mapped based on use of user mapping history 268. For example, the mapping function 140 checks the user map history 268 to find if there are any METHOD_MANUAL or METHOD_HISTORY entries for a given managed object under test (e.g., resource 120 attempted to be mapped to a corresponding identity) for a given server resource. If found, the user mapping history 268 returns the appropriate mapping information and flow continues at step 299. That is, a. If the mapping function 140 finds a match, the mapping function 140 sets the Map State to MAPPED_ONE and sets the Map Method to METHOD_HISTORY.

b. If the mapping function 140 does not find a match using the user mapping history 265, the mapping function 140 continues with step 280 (e.g., calls an the Auto-map algorithm) to map the resource under test to a corresponding identity.

| Map Method | Value | Description | (UI Map Method) |
| --- | --- | --- | --- |
| METHOD_NONE | −1 | Not mapped, either by auto-map or by user. | |
| METHOD_MANUAL | 0 | User manually mapped via manual-map function 265. | (Manual) |
| METHOD_AUTO_HISTORY | 1 | Auto mapped using user mapping history 268. | (Auto-History) |
| METHOD_AUTO_GLOBAL | 2 | Auto mapped using global map 273. | (Auto-EMC) |
| METHOD_AUTO_REVERSE | 3 | Auto mapped using reverse lookup function 340. | (Auto-EMC) |
| METHOD_AUTO_MATCHING | 4 | Auto mapped using matching service function 345. | (Auto-EMC) |
| METHOD_AUTO_EXACT | 5 | Auto mapped by exact string match function 318. | (Auto-EMC) |

In one embodiment, the type of method recorded for a given mapping is more detailed than the method type actually displayed to a respective user. For example, a more detailed method is recorded for purposes of running statistics on the definition files to determine which mapping methods produce the best results. The map method may have no bearing whatsoever on how the data is imported.

Algorithm Invocation

The auto-mapping function 260 can be invoked under any of the following conditions: i) such as part of an import process in which the information collection function 142 communicates to retrieve data associated with the storage area network resource 120, ii) as a result of a San Advisor version changed in a definition file, iii) when SAN Advisor software is upgraded to a new version.

For a given resource 120 (e.g., managed object resource), mapping function 140 performs the following steps until yielding a result (e.g., mapping) for the given resource 120. After mapping a given resource and setting the map type and map state for the resource 120, the mapping function 140 performs the same routine for other resources in the storage area network environment 100.

Accordingly, one embodiment herein includes comparing the collection of data associated with a corresponding storage area network resource 120 with a set of mapping information (e.g., user mapping history 268 or global map 273) to identify a specific identity of the resource prior to modifying the collection of data. As will be discussed later in this specification, the mapping function 140 can apply a data cleanup function 290 to modify the collection of data in response to failing to match the collection of data with an entry in the user mapping history 268 or the global map 273.

Auto-Map (e.g., Auto-EMC) Algorithm

This part of the algorithm computes only recommended mappings. In step 280, the mapping function 140 searches the global map 273 in order to attempt to find an entry for the collected data associated with the resource under test (e.g., resource 120). If a map is found in global map 273, the mapping function 140 sets the corresponding map state for the resource to MAPPED_ONE and sets the Map Method to METHOD_GLOBAL. If nothing is found in global map 273 for the collected value in step 280, the mapping function 140 initiates execution of data cleanup function 290.

In general, data cleanup function 290 modifies the collected data (e.g., removes useless mapping information in the strings) and stores the "cleaned" value in the definition file.

Only entries that are specified in the data cleanup service 290 get cleaned.

FIG. 3 illustrates further details associated with mapping function 140. For example, the mapping function 140 applies server mapping 310, software mapping 312, and array mapping 314. In addition to server mapping 310, the mapping function 140 applies host bus adapter mapping 325 and operating system mapping 335.

As their names suggest, the mapping function 140 applies these different mappings according to a type associated with the resource 120 being mapped. For example, the mapping function 140 applies server mapping 310 to server type resources 120. The mapping function 140 applies software mapping 312 to software type resources 120. The mapping function 140 applies array mapping to storage array type resources.

Using the cleaned character string value produced by data cleanup function 240 (or collected value in case there is no cleaned up value), the mapping function applies either one or both of reverse lookup function 340 and matching service function 345 to the modified collected data associated with the resource under test.

For example, if the resource under test is a host bus adapter driver or host bus adapter firmware, the mapping function 140 applies reverse lookup function 340 to attempt to match the unknown resource with a known identity.

If the resource under test is a host bus adapter driver model, the mapping function 140 applies matching service function 345 to attempt to match the unknown resource with a known identity.

If the resource under test is an operating system resource, the mapping function 140 applies matching service function 345 to attempt to match the unknown resource with a known identity.

If the resource under test is switch firmware, the mapping function 140 applies reverse lookup function 340 to attempt to match the unknown resource with a known identity. If the resource under test is a switch model, the mapping function 140 applies matching service function 345 to attempt to match the unknown resource with a known identity.

If the resource under test is a storage array resource, the mapping function 140 applies matching service function 345 to attempt to match the unknown resource with a known identity.

As previously discussed and as indicated in step 350, for each mapping, the mapping function 140 provides an indication of map-type and mapping method used to map the corresponding resource.

In one embodiment, the mapping function 140 selectively applies the reverse lookup function 340 to a given set of collected data (or cleaned data as produced by data cleanup function 240) associated with the resource under test. Application of the reverse lookup function 340 can lead to any one of the following results:

a. If the cleaned or collected value is unknown, not applicable, or empty, then the mapping function 140 sets the map state to MAPPED_NONE and sets the map method to METHOD_NONE for the resource under test.

b. If a specific identifier is found for the given cleaned value associated with the resource under test, then the mapping function sets the map state to MAPPED_ONE and sets the map method to METHOD_REVERSE for the resource under test.

c. If no specific identifier is found for the given cleaned value associated with the resource under test, the mapping function 140 sets the map state to MAPPED_NOT_LISTED and sets the map method to METHOD_REVERSE for the resource under test.

Using the cleaned value (or collected value in case there is no cleaned value), the mapping function 140 can also apply the matching service function 345 to map the resource under test to a corresponding identifier value. The mapping function 140 applies the matching service function 345 only for items that are specified in the matching service function 345. Application of the matching service function 345 can lead to any one of the following results:

a. If the cleaned or collected value is unknown, not applicable, or empty, the mapping function 140 sets the map state to MAPPED_NONE and sets the map method to METHOD_NONE for the resource under test.

b. If application of the matching service function 345 results in mapping to only one identifier value, the mapping function 140 sets the map state to MAPPED_ONE and sets the map method to METHOD_MATCHING for the resource under test.

c. If application of the matching service function 345 results in mapping to multiple identifier values, the mapping function sets the map state to MAPPED_MULTIPLE and sets the map method to METHOD_MATCHING for the resource under test.

d. If application of the matching service function 345 results in mapping to one specific identifier value that is not found in a supported set of resources, the mapping function 140 sets the map state to MAPPED_NOT_LISTED and sets the map method to METHOD_MATCHING for the resource under test.

If the mapping function 140 is unable to map the collected data or modified collection of data associated with a resource under test to a corresponding identifier value as discussed above using reverse lookup function 340 or matching service function 345, then the mapping function 140 initiates extracting string match function 318 to attempt an exact match of the modified collection of data (or unmodified collection of data) to a corresponding identifier value. Applying function 318 after (as opposed to before) the above functions enables the mapping function 140 to produce a more accurate matching result since the above processes may reveal ambiguities or provide a direct mapping to a specific resource type.

If mapping function 140 identifies an exact match in step 318, the mapping function 140 sets the map state to MAPPED_NOT_LISTED and sets the map method to METHOD_AUTO_EXACT for the resource under test.

If none of the above steps and functions yields a matching of the collection of data or modified collection of data with a corresponding resource type, then the mapping function 140 sets the map state to MAPPED_NONE and sets the map method to METHOD_NONE for the resource under test.

Common Mapping Services

Embodiments herein can include a globalmap.xml file that specifies what set of common services are used by which type of component types. For example, the following excerpt from globalmap.xml shows how host bus adapter type data is cleaned up (the <cleanup> section), how reverse lookups are performed (the <lookup> section), and how matching is to be performed (the <matchup> section):

<CommonServices>
<componentType name="HOST_BUS_ADAPTER" typeSid="10">

```
<cleanup>
    <firmware ignoreInput="(^Unknown$)|(^N/A$)">
        <exclude     value="^ISP\d\d\d\d\D{0,15}Host
           Adapter Driver:( ){0,3}"/>
        <include value="(none)|(2r2)|(a12)|((risc )?(pdc )?
           (iof )?(rom (firmware |\.)?)?(V?\d{1,5}(\.\d{1,
           5})* (\.\d[\w\-]{0,6})))"/>
    </firmware>
</cleanup>
<lookup>
    <firmware input="(Anone$)|(^2r2$)|(^a12$)|(\.)"ignor-
       eInput="(^Unknown$)|(^N/A$)">
        <algorithm name="matchExactEpic" order="0">
            <param name="fullStringMatch" value="true"/>
        </algorithm>
    </firmware>
</lookup>
<matchup>
    <group>
        <vendor input=".*Emulex.*">
            <output ESM=".*" logic="ClosestMatch"/>
        </vendor>
        <model input=".*LP9802DCDC.*"">
            <output ESM=".*LP9802DC.*" sid="-99"/>
        </model>
    </group>
</matchup>
</componentType>
<componentType name="SWITCH" typeSid="20">
```

All of these sections contain regular expressions for string matching.

Input Filtering

Each section of individual common service has details about what input the common service will process and how it is processed, as specified by two attributes: "input" and "ignoreInput".

The "input" attribute is used to indicate which values are to be processed by the service. For example, the regular expression in the following excerpt says to process any firmware that starts with "version".

... <cleanup>
<firmware input="^version"> ...

The "ignoreInput" attribute is used to indicate which values are NOT to be processed by the service. For example, the regular expression in the following excerpt says to process every firmware that is not "Unknown" and not "N/A".

... <cleanup>
<firmware ignoreInput="(^Unknown$)|(^N/A$)"> ...

When both attributes are present, "ignoreInput" takes precedence over "input". For example, the regular expression in the following excerpt says to process every firmware that begins with "version" but does not contain a dash "-".

... <cleanup>
<firmware input="^version" ignoreInput="\-"> ...

The actual logic is implemented in CleanupTask.java.

Grouping

Multiple items can be grouped, so the common service will process elements in the group together. For example, the excerpt below shows that the matching service is going to process all HBAs (e.g., Host Bus Adapters) whose collected Vendor value has "Emulex" and whose collected Model value has "LP9802DCDC" together:

```
<matchup>
... <group>
    <vendor input=".*Emulex.*">
        <output ESM=".*" logic="ClosestMatch"/>
    </vendor>
    <model input=".*LP9802DCDC.*"> ....
```

Data Cleanup Function 290

As previously discussed, the data cleanup function 290 cleans the garbage (e.g., unnecessary data) from collected values so that later processes can more easily perform a matching to an identity. Collected values from respective resources 120 may have an excess amount of unnecessary data that hinders the mapping function 140 from mapping resources 120 to known identities.

In one embodiment, the data cleanup function 290 excludes or removes any data that is deemed not useful for auto-mapping purposes. This function can be designed not to remove or exclude any useful information. A cleanup section in the <cleanup> section of a globalmap.xml file can be coded to identify what kind of collected data gets cleaned up and removed:

```
<componentType     name="HOST_BUS_ADAPTER"
typeSid="10">
    <cleanup>
        <driver input="[^(Unknown|N/A)]">
            <exclude value="; HBAAPI.*,( ){0,2}\d{1,2}\-\d{1,
               2}\-\d{1,4}$"/>
            <exclude value="; HBAAPI.*,( ){0,2}\d{1,2}\-\d{1,
               2}\-\d{1,4}$"/>
        <exclude value="^5\-"/>
        <include   value="(1R1)|(4.10.4002   SET   V.1.02)
           |V?\d{1,5}(\.\d{1,5})*(\.\d[\w\-] {0,6})))"/>
        </driver>
        <firmware>
        <exclude     value="^ISP\d\d\d\d\D{0,15}Host   Adapter
Driver:( ){0,3}"/>
        <include value="(none)|(2r2)|(a12)"/>
        </firmware>
```

In the sample shown above only HBA driver and HBA firmware data are cleaned using this function, but it is possible that any collected value can be specified in a similar way by adding a corresponding similar section to globalmap.xml.

As will be discussed in the following sections of this detailed description section, the data cleanup function 290 can apply a set of exclude patterns (e.g., one after another) and a set of include patterns to produce a so-called cleaned value.

Exclude Patterns

The data cleanup function 290 can implement a set of one or more exclude (regular expression) patterns to remove a set of unwanted data. The exclude patterns can be applied one after another to remove data from the collected value (e.g., a raw data string received from the resource under test). In certain cases, the data cleanup function 290 may initiate reverting back to an originally received string if it finds that the cleaned data is empty after applying a respective exclude pattern.

Example of applying exclude filter pattern #1

If the collected value=5-1.02a3-emc; HBAAPI v2.0.d, 11-07-03
Step 1) After applying pattern
<exclude value="; HBAAPI.*,( ){0,2}\d{1,2}\-\d{1,2}\-\d{1,4}$"/>
Cleaned Value=5-1.02a3-emc
Step 2) After applying pattern
<exclude value="^5\-"/>
Cleaned Value=1.02a3-emc Example 2

Collected Value=; HBAAPI v2.0.d, 11-07-03
Step 1) After applying pattern
<exclude value="; HBAAPI.*,( ){0,2}\d{1,2}\-\d{1,2}\-\d{1,4}$"/>
Cleaned Value=Empty
In this example case, the data cleanup function 140 reverts back to use of the character string "; HBAAPI v2.0.d, 11-07-03" because application of the data cleanup function 290 should never result in a completely empty string.

Include Patterns

Include patterns that are specified as part of the data cleanup function 290 that prevents deletion of important data that could be useful in the mapping process. Include patterns can be applied on cleaned data (e.g., a subset of data produced by applying exclude patterns associated with data cleanup function 290) as discussed above. If an include pattern can be matched to the cleaned data, that matching part is extracted as valid cleaned data. Otherwise, application of the include pattern does not change the set of data in anyway.

Example #3

Collected Value: 5-1.02a3-emc; HBAAPI v2.0.d, 11-07-03
At the end of applying Exclude patterns, cleaned data is 1.02a3-emc
Step 1) Apply include pattern
<include value="(1R1)|(4.10.4002 SET V1.02)|V?\d{1,5}(\.\d{1,5})*(\.\d[\w\-] {0,6})))"/>
Cleaned Value: 1.02a3 (only this part matched input pattern in bold)

Example #4

Collected Value was: CD391A1
Step 1) Apply include pattern
<include value="(1R1)|(4.10.4002 SET V1.02)|V?\d{1,5}(\.\d{1,5})*(\.\d[\w\-] {0,6})))"/>
Cleaned Value: CD391A1 (does not match any input pattern, so untouched)

Accordingly, embodiments herein include maintaining multiple filters for selectively applying to the collection of data for each of multiple resources 120 to produce corresponding modified collections of data. Data cleanup function 290 modify a set of raw data received from a corresponding storage area network resource 120 by detecting that a first portion of the collection of data (e.g., raw data string) matches a pattern associated with a first filter of the multiple filters. The data cleanup function 290 applies the first filter to remove a first data portion from the collection of data. Additionally, the data cleanup function 290 can detect that a second portion of the collection of data matches a pattern associated with a second filter of multiple filters. The data cleanup function 290 then applies the second filter to remove a second data portion from the collection of data. The data cleanup function 290 can repeat this process until it produces a so-called cleaned data string.

As discussed above, the data cleanup function 290 may apply one or more include and/or exclude filters. However, application of the filters or patterns may or may not result in modification to the raw data string.

Reverse Lookup Function 340

Mapping function 140 initiates application of a reverse lookup function to 340 the modified collection of data (e.g., cleaned data produced by data cleanup function 290) to identify a specific identity associated with the resource. Application of the reverse lookup function 340 can include verifying whether character string information associated with a known specific identity of a possible storage area network resources matches any portion of the modified collection of data produced by the data cleanup function 290.

Accordingly, one purpose of the reverse lookup function 340 is to find one or more suitable identity matches for each of the resources 120. In one embodiment, the reverse lookup function 340 is mainly used for attempting matching associated with Switch Firmware, HBA Drivers, and HBA Firmware. The reverse lookup function 340 attempts to produce one answer (MAPPED_ONE or MAPPED_NOT_LISTED) for a given resource under test.

As an example, cleaned data (e.g., modified data produced as a result of applying data cleanup function 290) is inputted to the reverse lookup function 340. Similar to the data cleanup function 290, items specified in the globalmap.xml get looked up in a reverse manner as shown below:

<lookup>
<firmware input="^CD\d\d\d\w\d$">
<algorithm name="matchChangedEpic" order="0">
<param name="epicPattern" value="\."/>
<param name="freplacewith" value=""/>
<param name="fullStringMatch" value="false"/>
</algorithm>
</firmware>
<firmware ignoreInput="^Unknown$)|(^N/A$)|(^CD\d\\dd\w\d$)">
<algorithm name="matchExactEpic" order="0">
<param name="fullStringMatch" value="true"/>
</algorithm>
</firmware>
</lookup>

Each <algorithm> section is a reverse lookup method in the reverse lookup function 340 that should be used for component type matching the "input" and/or "ignoreInput" parameter. Each <algorithm> section can contain zero, one, or more <param> nodes, which contain configurable parameters within the algorithm.

In the above example, any firmware input value matching the pattern "^CD\d\d\d\w\d$", e.g. "CD391A3" will use the "matchChangedEpic" algorithm directly (first <firmware> section), with the three attributes specified in <param> nodes. The second <firmware> section applies to all other input except "unknown" and "N/A". For data falling into that category, we will use the "matchExactEpic" algorithm with fullStringMatch=true.

The following tables list the algorithms available in the reverse lookup function 340 that can be referenced in the XML file:

MatchExactEpic Algorithm:

| Algorithm | Parameter | Meaning |
|---|---|---|
| matchExactEpic | | Compare with unmodified ESM values.<br>Example:<br>ESM has 3.91A1, 3.91A2, etc.<br>Collected value is 3.91A1<br>Reverse lookup will match to "3.91A1" because collected value matches ESM value. |
| | fullStringMatch | Look for full string match. If this is false or not present, reverse lookup only tries to find if the ESM value is contained in the cleaned data.<br>Example (fullStringMatch = false):<br>ESM has "1.1",<br>Collected value is "1.1.1"<br>Reverse lookup will match to "1.1" because "1.1" is contained in "1.1.1"<br>Example (fullStringMatch = true):<br>ESM has "1.1",<br>Collected value is "1.1.1"<br>Reverse lookup will not match to "1.1" because "1.1" is not an exact match with "1.1.1" |

MatchChangedEpic Algorithm:

| Algorithm | Parameter | Meaning |
|---|---|---|
| matchChangedEpic | | Compare with modified ESM values.<br>Example:<br>Assuming epicPattern = "\.",<br>replacewith = "", fullStringMatch="true",<br>ESM has 3.91A1, 3.91A2, etc.<br>Collected value is CD391A1<br>Reverse lookup will match to "3.91A1".<br>This is because ESM value "3.91A1" is first transformed to "391A1", and "391A1" is contained in "CD391A1". |
| | epicPattern | Only apply this logic to ESM values containing the given pattern. |
| | Replacewith | If present, replace epicPattern with the given value, before the comparison. |
| | inputPattern<br>inputReplacewith | Modify input value using given patterns.<br>If inputPattern is is not present, input value is not changed. |
| | fullStringMatch | The meaning is the same as stated in the "matchExactEpic" algorithm table. | mAtchByVersionCompare Algorithm:

| Algorithm | Parameter | Meaning |
|---|---|---|
| matchByVersionCompare | | Compare with modified ESM values.<br>Example:<br>Assuming epicPattern="or higher$",<br>replacewith = "",<br>subVersionsToCompare="1",<br>ESM has 2.00E or higher.<br>Collected value is 2.00F<br>Reverse lookup will match to "2.00E or higher". This is because ESM value "2.00E or higher" is first transformed into ""2.00E". Then collected value ""2.00F" is compared to it yielding a match. |
| | epicPattern | Only apply this logic to ESM values containing the given pattern. |
| | replacewith | If present, replace epicPattern with the given value, before the comparison. |
| | subVersionsToCompare | How many sub-version components, starting from the least significant sub-version, are used for the numeric comparison. |

Matching Service Function 345

The matching service function 345 is responsible to look for matching cleaned values produced by the data cleanup function 290 to the corresponding identities using regular expressions. The result can be any of the mapping states. The matching service function is used by Host Bus Adapter Models, Operating System Models, Switch Models and Storage Array Models. Similar to the other services, a sub function <matchup> section of globalmap.xml controls how the matching service operates on the different resources information.

For example, for a given "cleaned" value produced by data cleanup function 290, the matching service function 345 will look for the first group that matches the input. Once an input match is found, it will look for output matches to return.

The matching service function 345 will also use various parameters of <output> to determine what it returns. For example, the <output> parameter ESM=".*LP9802DC.*" looks for all identifier values in this category (here HBA model) that match ".*LP9802DC.*".

There are 3 possible output parameters associated with the matching service function 345:

1. Identifier values—Component identifiers used to find components from the database. If one or more identifier values is available, the other two (ESM and Logic) will not be used.

2. ESM—Regular expression used to find matches from the EPIC database.

3. Logic such as a method name used to determine matches.

First, the matching service function 345 looks for a vendor input match. If there is a vendor match, the matching service function 345 will look for the output identifier value (e.g., SID). If none is produced, the matching service function 345 will look for a model input match. If there is a model match, the matching service function 345 will look for the appropriate identifier value for the cleanup string value (e.g., SID). If none is produced, the matching service function 345 will look for the output ESM regular expression to find matches. If none is produced, the matching service function 345 will use the output logic if available.

If the collected values for HBA are a vendor of "Emulex Corporation" and a model of "LP9802DCDC", then the matching service will map to multiple HBAs as shown below. This is a case where a storage area network resource is mapped to multiple possible identities. In other words, the matching service function 345 is uncertain which of multiple resources the collected value should be mapped.

| Collected Value | Mapped To |
| --- | --- |
| Emulex Corporation LP9802DCDC | Emulex LP9802DC-E<br>Hewlett Packard FCA2404DC (LP9802DC) |

Accordingly, one embodiment herein includes identifying one or more possible types associated with the resource under test (e.g., a storage area network resource 120 producing the character string "Emulex Corporation LP9802DCDC") based on the mapping function 140 parsing the modified collection of data (e.g., cleaned data produced by data cleanup function 290) and matching a portion of the modified collection of data with a set of character string information associated with corresponding possible model types associated with the resource. In the context of the present example, after matching, the mapping function 140 provides an indication (e.g., notification) that storage area network resource provisionally maps to each of at least two different vendor types such as a resource provided by Emulex and a resource provided by Hewlett Packard.

In a similar vein, the mapping function 140 can parse the modified collection of data (e.g., cleaned data produced by data cleanup function 290) and match a portion of the modified collection of data with a set of character string information associated with corresponding known model types to identify a model type associated with the resource. After matching, the mapping function 140 can provide notification that the resource maps to one or more corresponding model types of the same or different vendors.

If the <output> parameter is sid="-99", the matching service will return this value indicating there was no matching to a corresponding identifier value.

| Collected Value | Mapped To |
| --- | --- |
| Jni FCI-1063<br>JNI FCW<br>JNI Corporation FC-1063<br>JNI Corporation FC64-1063<br>JNI Corporation FCE-1063<br>JNI Corporation FCE-6460-N<br>JNI Corporation FCE2-6412-N<br>JNI Corporation FCI-1063 | NOT_IN_ESM_SID (–99) |

The matching service function 345 can enable back-referencing to regular expressions. That is, the output regular expression will be able to reference back to an input regular expression so we can write just one regular expression for both. An example is shown below.

<matchup>
  <group>
    <vendor input=".*Emulex.*">
      <output ESM=".*"/>
    </vendor>
    <model input=".*LP(\d\+).*">
      <output ESM=".*LP\1.*"/>
    </model>
  </group>

The output expression ESM=".*LP\1.*" has a \1, which refers to the first parameterized sub expression of the input regular expression. If you expand the above expression it will look for values such as LP10000, LP9002, LP9802, LP8000, etc. and their corresponding ESM expressions will be LP10000, LP9002, LP9802, LP8000 etc.

When does the Auto-Map Algorithm Change a Mapping or Unmap?

As a feature, SAN Advisor will change the mapping of an item automatically when there is an upgrade to the customer's environment that invalidates their current mapping or when SAN Advisor has a corrected mapping in a monthly update. This can happen under the follow 2 circumstances:

1. The current map method is automatic, but the auto-map value has changed. If the current mapping was obtained automatically (method is METHOD_AUTO_*) and the computed automatic mapping value is different than the current map value, the new automatic value will replace the old automatic value. This can happen when SAN Advisor changes in a monthly update. It allows the SAN Advisor team to correct incorrectly auto-mapped values over time. For example, if we incorrectly auto-mapped driver 6.01 to 6.01e in the global map, we could correct that in a later drop and have the new mapping take effect automatically. Hopefully, this will be very rare.

2. The snapshot value has changed. If the snapshot value has changed (due to an upgrade in the customer's SAN), then one of the following 2 things will happen:

a. If there is a computed auto-map value. In this case, if the auto-map value is different than the current map value, the map value will be set to the auto-map value, the map method will be set to the appropriate method, and no rule will be fired. This is the case where we successfully detected the change to the environment and automatically mapped it for the customer. If the auto-map value is the same as the current map value, nothing is changed.

b. If there is not a computed auto-map value. In this case, rule 7005 will fire, the Mapping Issue Icon will appear on the Map Systems tab and the mapping will be set to Not Mapped. We successfully detected the change to the environment, but could not automatically map the new value for the customer.

Figure 4:
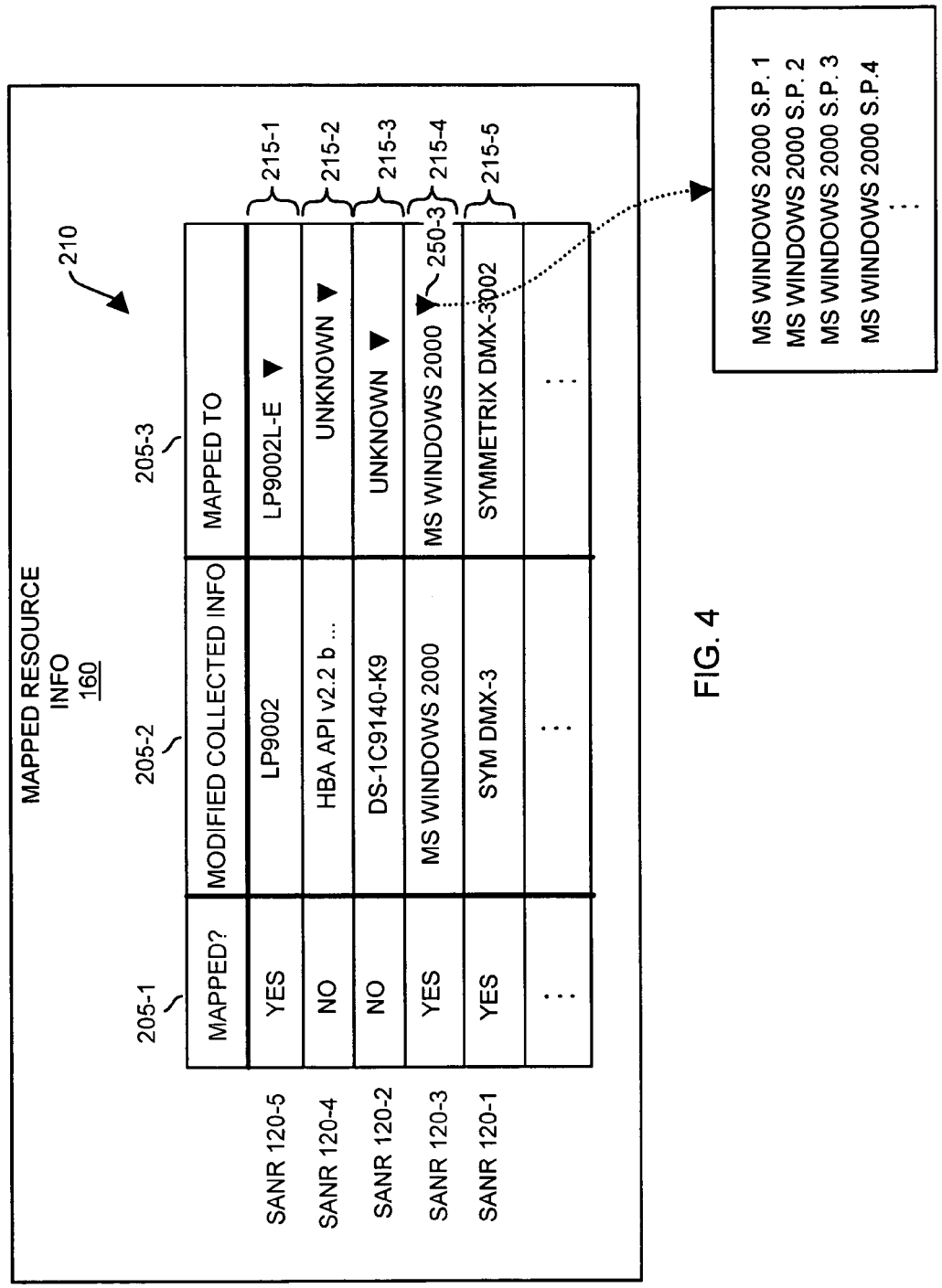
FIG. 4 is a diagram illustrating a sample of mapped and unmapped resources according to embodiments herein.

FIG. 4 is a diagram illustrating use of table 210 including a listing of mapped and unmapped storage area network resources 120 based on application of mapping function 140 according to embodiments herein.

As shown, column 205-1 of table 210 indicates whether the mapping function 140 was able to map a respective storage area network resource 120 into a corresponding known type of storage area network resource. Column 205-2 of table 210 indicates modified collected information (e.g., after being a cleaned up or filtered by data cleanup function 290) associated with a respective storage area network resource 120 that is used to map or attempt mapping of unknown types of storage area network resources 120 to respective known types of storage area network resource identifiers.

In one embodiment, a respective user 108 can place a prompt (e.g., an arrow on display screen 130 associated with a computer mouse) in a vicinity of the modified collection of data. In response to such an action, the display screen 130 displays the raw received data string (e.g., original collection of data) associated with the respective resource in lieu of or in an area near the cleaned up version of the collection of data appearing in column 205-2.

Note that the information appearing in column 205-2 can include actual or modified data strings of information collected from or originated by different types of sources such as a respective network administrator, the storage area network resources 120, agents 131, etc. In one embodiment, the column 205-2 of modified collected information represents data string information (e.g., vendor and model information) generated by and received from a respective storage area network resource.

Column 205-3 of table 210 includes specific identifier values indicating deduced identifier types associated with respective storage area network resources 120 as specified by the application of mapping function 140. That is, as previously discussed, the mapping function 140 utilizes the modified collected information in column 205-2 (and potentially other information) to generate the specific type identifier values in column 205-3.

In certain cases, the mapping function 140 is able to immediately map a respective storage area network resource 120 to a corresponding identifier value based on the collected information in column 205-2. For example, as discussed above, the mapping function 140 may apply user mapping history 268 and/or global map 273 to map collected information (e.g., LP9002) in row 215-1 directly into a respective known type (e.g., qualified or pre-tested type) of storage area network resource, namely, LP9002L-E understood by the SAN advisory process 106.

Other entries in table 210 require the mapping function 140 to perform further processing than merely applying user mapping history 268 and global map 273 because the collected information in column 205-2 of table 210 does not lend itself to a mapping of the collection of data or modified collection of data to a respective known type of storage area network resource as previously discussed. For example, the mapping function 140 applies data cleanup function 290, reverse lookup function 340, matching service function 345 as well as other mapping techniques to map a resource under test to a corresponding known type of resource.

Based on the cleaned up data string information "MS WINDOWS 2000" in column 205-2, the mapping function 140 attempts to globally map the storage area network resource 120-1 to a known type of storage area network resource. Assume that an initially applied global map 273 or user mapping history 268 fails because multiple different types of resources provide the same data string of information when queried about vendor and model information. Even though the mapping function 140 cannot precisely map storage area network resource 120-3 based on the string "MS WINDOWS 2000," the mapping function 140 can narrow unknown type of storage area network resource to several possible known type of storage area network resources such as a MS WINDOWS 2000 SERVICE PACK 1, MS WINDOWS 2000 SERVICE PACK 2, MS WINDOWS 2000 SERVICE PACK 3, or MS WINDOWS 2000 SERVICE PACK 4. This is an example of mapping a single resource under test to multiple possible resources.

To manually initiate a mapping for ambiguous mapping such as that for MS WINDOWS 2000, the respective user 108 can assign a respective type associated with the storage area network resource 120-3 by clicking on symbol 250-3 (of FIG. 2), viewing a list (e.g., all or part of table 410 in FIG. 4) of most likely matching candidates on display screen 130-1, and selecting one (e.g., the MS WINDOWS 2000 SERVICE PACK 2) of multiple entries (e.g., as in table 210 of FIG. 4) as a type identifier. Thus, for unmapped entries in table 210 of FIG. 4, the respective user 108 can modify and provide final decisions as to how to map respective storage area network resources.

In one embodiment, the mapping information (e.g., automatically mapped information and/or manually mapped information) can be stored as a mapping definition file for reuse at a later time. For example, manual mapping information can be used to produce user mapping history 268 as previously discussed. Depending on the embodiment, the auto-mapping process as discussed herein can be a one-time process in which the user creates a mapping of resources to appropriate identifier values such that the mapping definition file includes identifiers understood by the SAN advisory process 106 instead of ambiguous names. After an initial mapping and creation of the mapping definition file, a respective network administrator or user 108 need only make incremental mapping changes (as assisted with the auto mapping features as discussed herein) for any upgrades or changes to originally mapped SAN configuration information 104.

Figure 5:
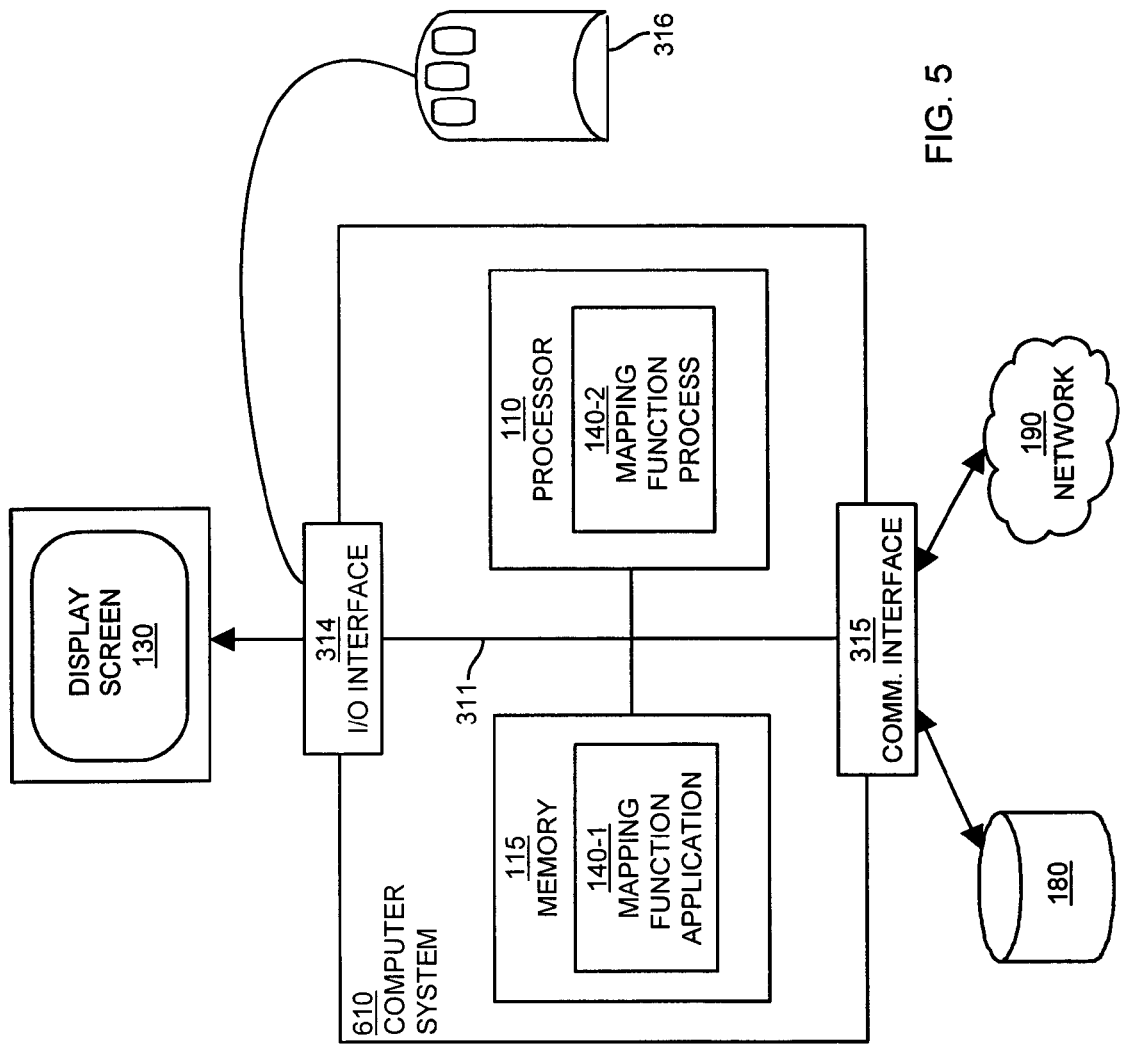
FIG. 5 is a diagram of an example platform for executing different mapping functionality according to embodiments herein.

FIG. 5 is a block diagram illustrating an example computer system 610 (e.g., a management control center) for executing mapping function 140 and other related processes according to embodiments herein. Computer system 610 can be a computerized device such as a personal computer, workstation, portable computing device, console, network terminal, processing device, etc.

As shown, computer system 610 of the present example includes an interconnect 311 that couples a memory system 115, a processor 110, an I/O interface 314, and a communications interface 315. Peripheral devices 316 (e.g., one or more optional user controlled devices such as a keyboard, mouse, display screens, etc.) couple to processor 110 through I/O interface 314. I/O interface 314 also enables computer system 610 to access repository 180 and display information on display screen 130. Communications interface 315 enables computer system 310 to communicate over network 190 to transmit and receive information from different resources (e.g., agents 131, storage area network resources 120, etc.) in storage area network environment 100. In one embodiment, computer system 610 can initiate the display of configuration information on corresponding display screens for viewing by one or more respective network administrators (e.g., user 108) that manage and view mappings associated with storage area network environment 100 (FIG. 1). In one embodiment, computer system 610 also supports execution of SAN advisory process 106 for application of rules 118.

As shown, memory system 115 is encoded with mapping function application 140-1 supporting assignment of type identifiers to unknown or partly known types of storage area network resources. Mapping function application 140-1 can be embodied as software code such as data and/or logic instructions (e.g., code stored in the memory or on another computer readable medium such as a disk) that support functionality according to different embodiments described herein.

During operation, processor 110 accesses memory system 115 via the interconnect 311 in order to launch, run, execute, interpret or otherwise perform the logic instructions of the mapping function application 140-1. Execution of mapping function application 140-1 produces processing functionality in mapping function process 140-2. In other words, the mapping function process 140-2 represents one or more portions of the mapping function application 140-1 (or the entire application) performing within or upon the processor 110 in the computer system 610.

It should be noted that the mapping function process 140-2 executed in an environment such as computer system 610 can be represented by either one or both of the mapping function application 140-1 and/or the mapping function process 140-2. For purposes of this discussion and different embodiments herein, general reference will again be made to the mapping function 140 as performing or supporting the various steps and functional operations as previously discussed and as will be discussed further in this specification.

It should be noted that, in addition to the mapping function process 140-2, embodiments herein include the mapping function application 140-1 itself (i.e., the un-executed or non-performing logic instructions and/or data). The mapping function application 140-1 can be stored on a computer readable medium such as a floppy disk, hard disk, or optical medium. The mapping function application 140-1 can also be stored in a memory type system such as in firmware, read only memory (ROM), or, as in this example, as executable code within the memory system 115 (e.g., within Random Access Memory or RAM). In addition to these embodiments, it should also be noted that other embodiments herein include the execution of mapping function application 140-1 in processor 110 as the mapping function process 140-2. Thus, those skilled in the art will understand that the computer system 610 may include other processes and/or software and hardware components, such as an operating system that controls allocation and use of hardware resources.

Functionality supported by computer system 610 such as a management control center utilizing mapping function 140 will now be discussed with respect to flowcharts in FIGS. 6-9. For purposes of this discussion, computer system 610 and, more particularly, mapping function 140 (or related functions) generally perform steps in the flowcharts at run-time. This functionality can be extended to the other entities as well. Also, note that the steps in the below flowcharts need not always be executed in the order shown.

Figure 6:
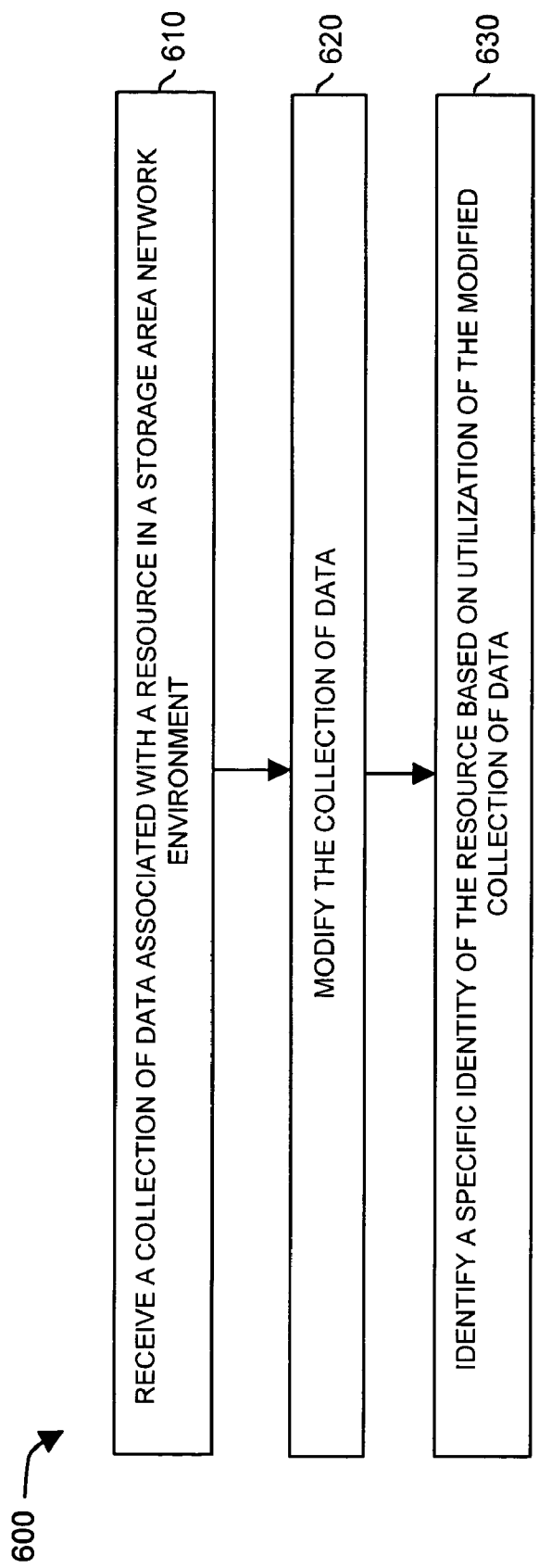
FIG. 6 is a flowchart illustrating a technique for mapping of one or more resources according to embodiments herein.

Now, more particularly, FIG. 6 is a flowchart 600 illustrating a technique of mapping respective resources to corresponding type identifiers according to an embodiment herein. Note that techniques discussed in flowchart 600 overlap and summarize some of the techniques discussed above.

In step 610, the mapping function 140 receives a collection of data associated with one or more resources 120 in a storage area network environment 100.

In step 620, the mapping function 140 modifies the collection of data received from the one or more storage area network resources 120.

In step 630, the mapping function 140 identifies specific identities of the one or more resources 120 based on utilization of the modified collection of data.

Figure 7:
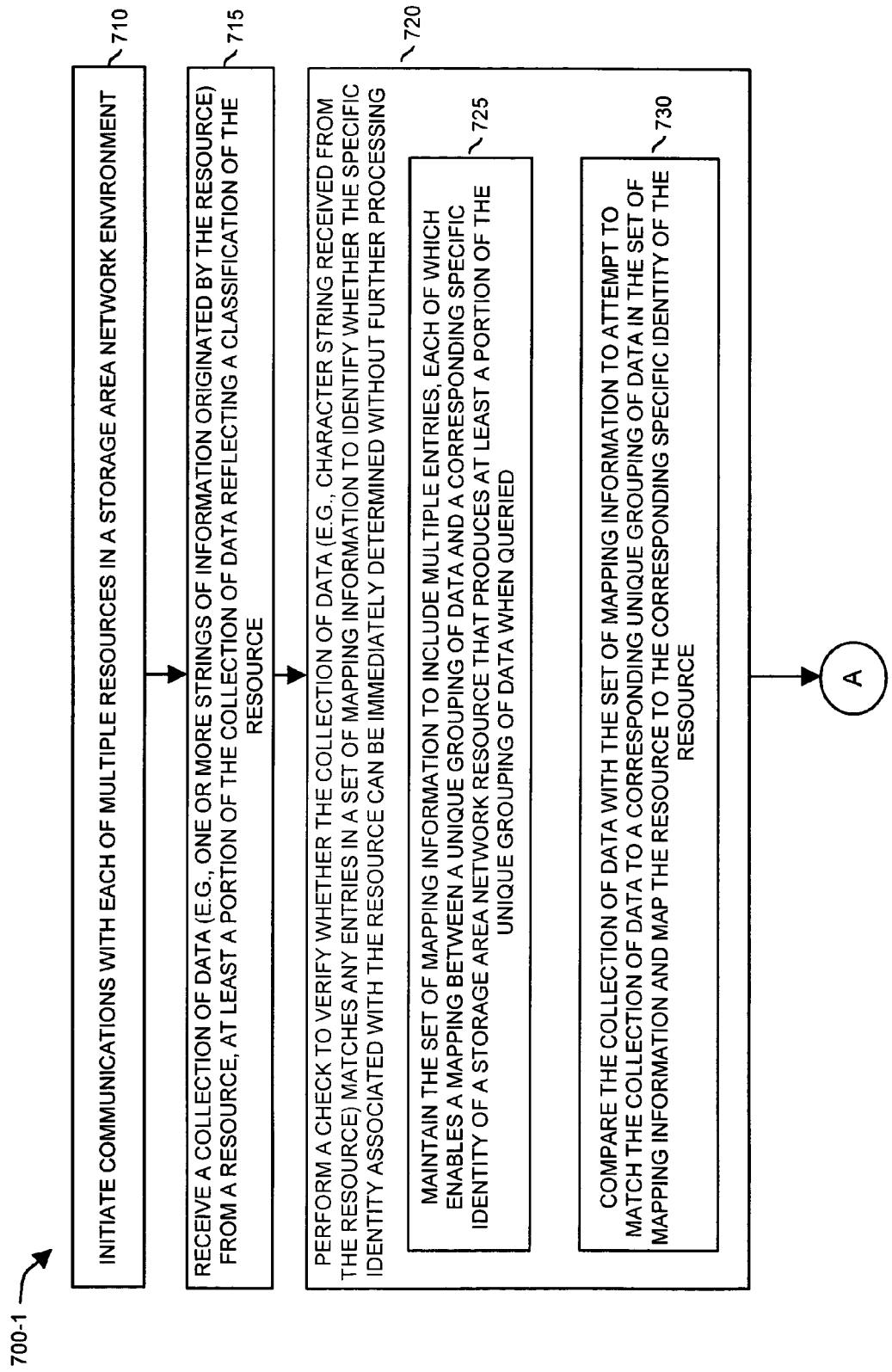
FIGS. 7, 8 and 9 combine to form a more detailed flowchart illustrating mapping techniques according to embodiments herein.
Figure 8:
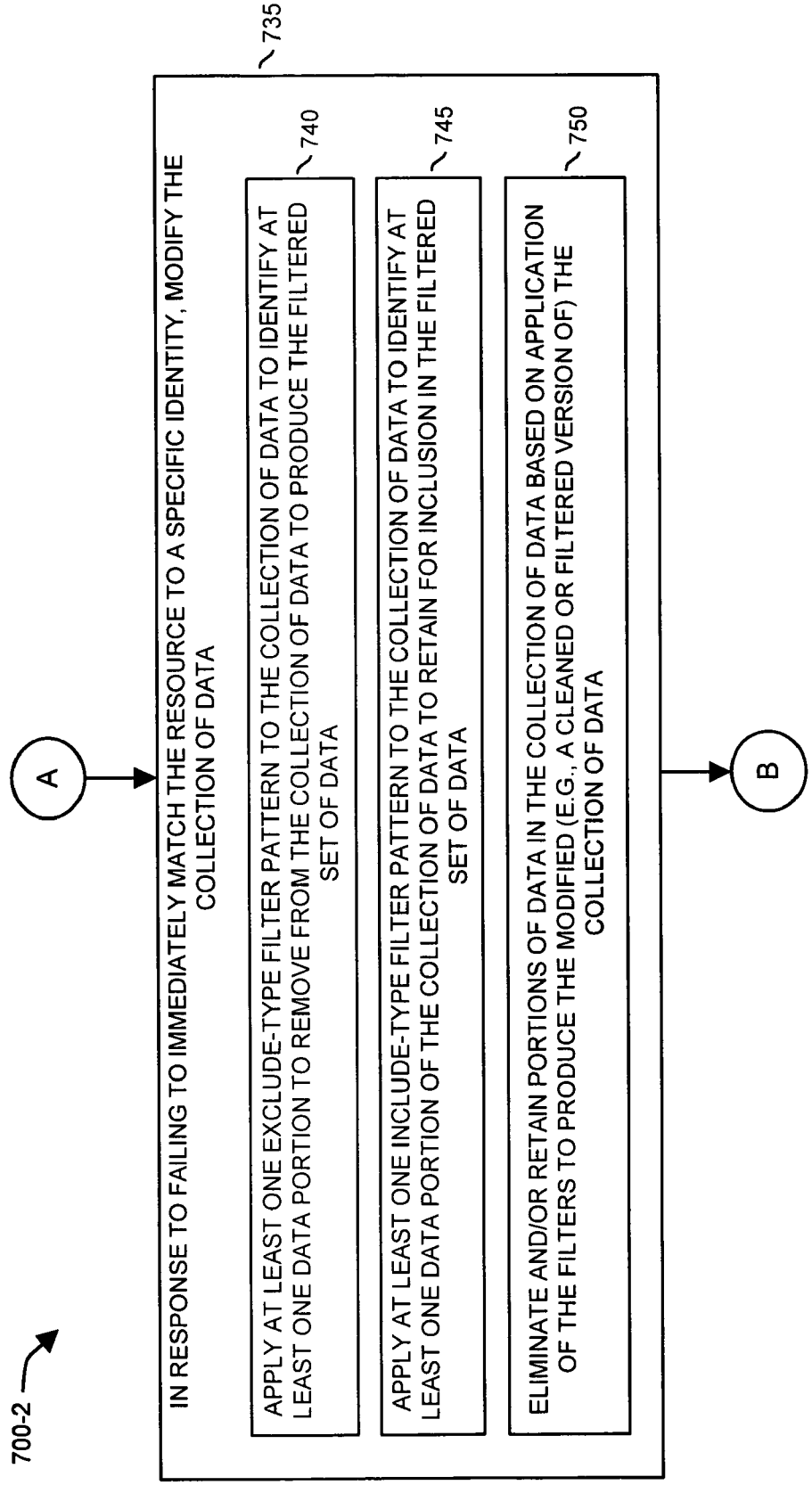
Figure 9:
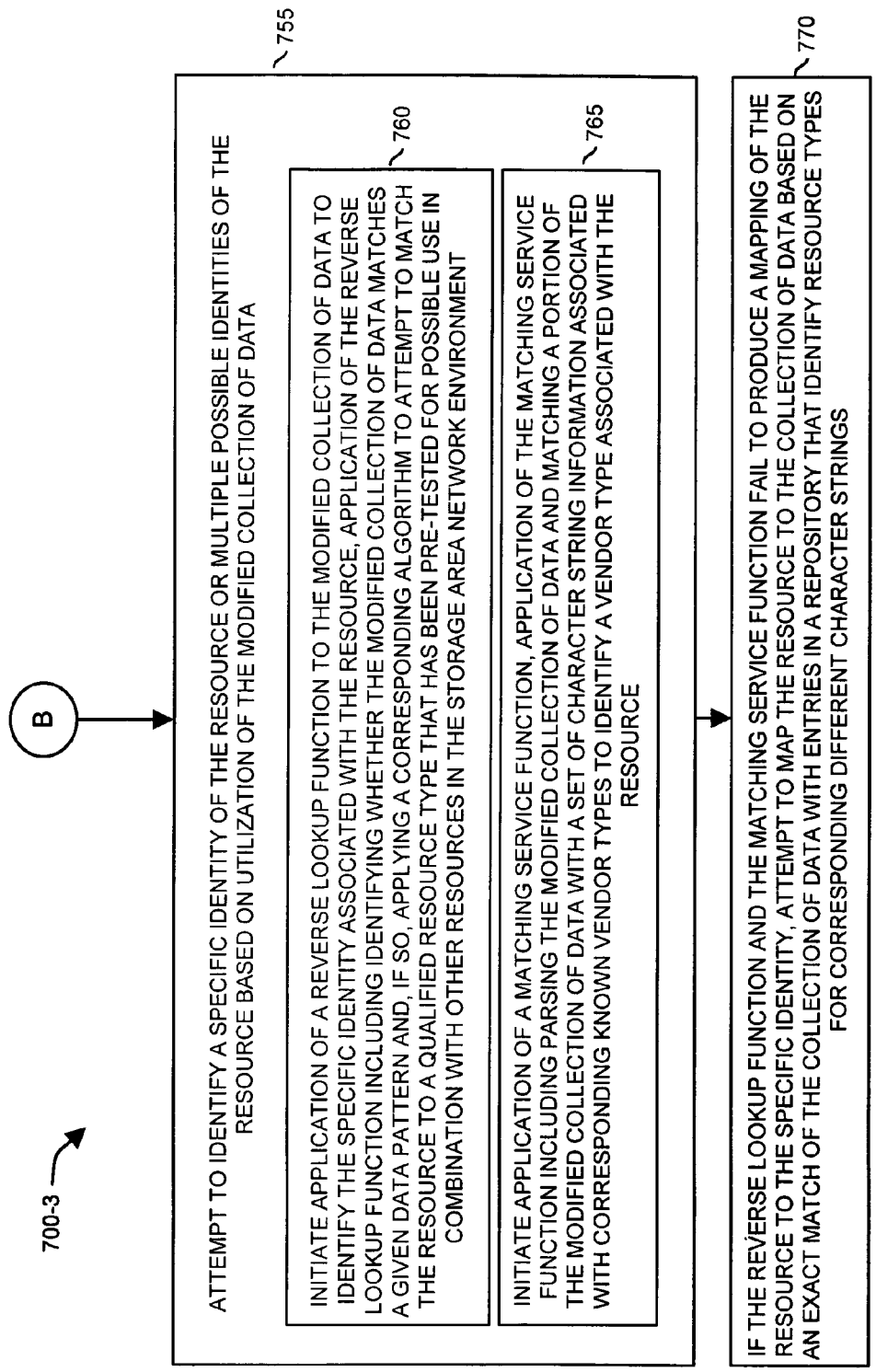

FIGS. 7, 8, and 9 combine to form a flowchart 700 (e.g., flowchart 700-1 and flowchart 700-2) illustrating processing steps associated with mapping function 140 according to an embodiment herein. Note that techniques discussed in flowchart 700 overlap with the techniques discussed above in the previous figures.

In step 710, the information collection function 142 initiates communications with a resource (or multiple resources 120) in a storage area network environment 100.

In step 715, the information collection function 142 receives a collection of data (e.g., one or more strings of information originated by the resource) from the resources 120. At least a portion of the collection of data from the resources reflects a classification of the resources identifying vendor, model, version, etc.

In step 720, the mapping function 140 performs a check to verify whether the collection of data (e.g., character string received from the resource) matches any entries in a set of mapping information (e.g., user mapping history 268 or global map 273) to identify whether the specific identity associated with the resource can be immediately determined without further processing.

In sub-step 725 associated with step 720, the mapping function 140 maintains a set of mapping information (e.g., user mapping history 268 and global map 273) to include multiple entries. Each entry of which enables a mapping between a unique grouping of data (e.g., collection of data or modified collection of data) and a corresponding specific identity of a storage area network resource that produces at least a portion of the unique grouping of data when queried.

In sub-step 730 associated with step 720, the mapping function 140 compares the collection of data associated with a given resource 120 with the set of mapping information to attempt to match the collection of data to a corresponding unique grouping of data in the set of mapping information in order to map the resource to the corresponding specific identity of the resource. The mapping function 140 can fail to match the collection of data with an entry in the set of mapping information in response to checking whether the collection of data matches any unique groupings of data in the set of mapping information (e.g., user mapping history and global mapping).

In step 735 of flowchart 700-2 in FIG. 8, in response to failing to immediately match the resource to a specific identity, the mapping function 140 modifies the collection of data via application of the data cleanup function 290.

In sub-step 740 associated with step 735, the mapping function 140 applies at least one exclude-type filter pattern to the collection of data to identify at least one data portion to remove from the collection of data to produce the filtered set of data (e.g., modified collection of data).

In sub-step 745 associated with step 735, the mapping function 140 applies at least one include-type filter pattern to the collection of data to identify at least one data portion of the collection of data to retain for inclusion in the filtered set of data (e.g., modified collection of data).

In sub-step 750 associated with step 735, the mapping function 140 eliminates and/or retains (e.g., via application of the exclude and include filters) portions of data in the collection of data based on application of the filters to produce the modified (e.g., a cleaned or filtered version of) the collection of data as produced by data cleanup function 290.

In step 755 of flowchart 700-3 in FIG. 9, the mapping function 140 attempts to identify a specific identity of a given resource or multiple possible identities that could be associated with the given resource under test based on utilization of the modified collection of data produced by the data cleanup function 290.

In sub-step 760 associated with step 755, the mapping function 140 initiates application of reverse lookup function 340 to the modified collection of data to identify the specific identity associated with the given resource 120. Application of the reverse lookup function 340 includes identifying whether the modified collection of data produced by the data cleanup function 290 matches a given pattern and, if so, applying a corresponding algorithm to attempt to match the given resource to a qualified resource type that has been pre-tested for possible use in combination with other resources 120 in the storage area network environment 100.

In sub-step 765 associated with step 755, the mapping function 140 initiates application of a matching service function 345. Application of the matching service function 345 includes parsing the modified collection of data produced by the data cleanup function 290 and matching a portion of the modified collection of data with a set of character string information associated with corresponding known vendor types to identify a vendor type associated with the resource.

In step 770, if the reverse lookup function 340 and the matching service function 345 fail to produce a mapping of the resource to one or more specific identities, the mapping function 140 attempts to map the resource under test based on an exact match of the collection of data or modified collection of data with entries in a repository that identify resource types for corresponding different character strings.

Figure 10:
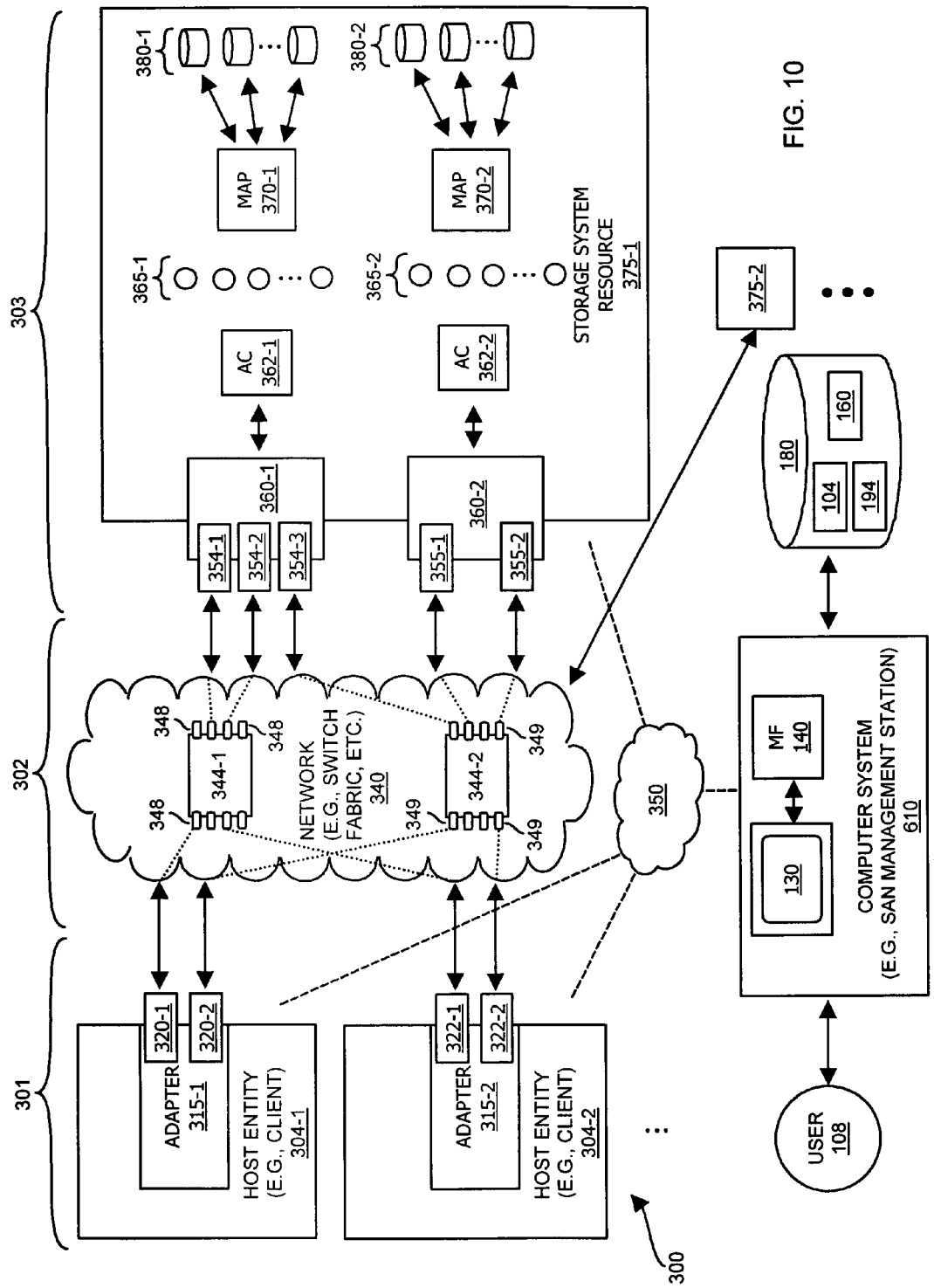
FIG. 10 is a block diagram illustrating resources in a storage area network environment according to an embodiment herein.

FIG. 10 is a block diagram more particularly illustrating connectivity of example resources (e.g., host resources 301, switch resources 302, and storage resources 303) in a storage area network environment 300. The resources and corresponding SAN configuration information 104 can be represented by managed objects and corresponding relationship information stored in repository 180 or other storage resource. In general, FIG. 10 illustrates different types of resources that can be employed in a respective storage area network environment 300.

As previously discussed for FIG. 1, a SAN advisory process 106 can apply rules 118 to indicate incompatible resources in storage area network environment 300 based on type identifiers. Mapping function 140 enables a respective user 108 to automatically assign type identifiers associated with the different resources in storage area network environment 300. In one embodiment, the user 108 utilizes display screen 130 to perform assignment operations.

Now referring to specific attributes in FIG. 10, storage area network environment 300 includes host entity 304-1 (e.g., a server), host entity 304-2, . . . (collectively, host entities 304), network 340 (e.g., a high speed fiber-based switch fabric), network 350 (e.g., LAN, WAN, Internet, intranet, etc.), storage system resource 375-1, storage system resource 375-2, computer system 110, and repository. Network 340 includes switch device 344-1, switch device 344-2, and corresponding switch ports 348 and 349. Host entity 304-1 includes adapter 315-1. Adapter 315-1 (e.g., host bus adapter) has a corresponding port 320-1 and port 320-2 to communicate (e.g., via a fiber link) over network 340. Host entity 304-2 includes adapter 315-2. Adapter 315-2 has corresponding port 322-1 and port 322-2 to communicate over network 340. Storage system resource 375-1 includes respective adapters 360-1 and 360-2, corresponding ports 354-1, 354-2, 354-3, 355-1 and 355-2, access controllers 362-1 and 362-2, storage devices 365-1 and 365-2, maps 370-1 and 370-2, as well as physical storage devices 380-1 and 380-2.

In general, network 340 and related resources enable host entities 304 (e.g., clients, host computers, etc.) to access data in storage system resources 375. As an example, host entity 304-1 couples to network 340 via adapter 315-1 and corresponding ports 320. Ports 320 couple to respective ports 348 and 349 on switch devices 344 via a link such as a fiber cable. In turn, ports 348 and 349 of switch devices 344 couple to ports 354 and 355 (e.g., via a fiber cable) of corresponding storage system resources 375. Thus, switch devices 344 and corresponding ports 348 and 349 form at least part of a connection path between host entities 304 and corresponding storage system resources 375.

Storage system resource 375-1 (e.g., a storage system) includes access controllers 362 to facilitate access to corresponding storage devices 365 (e.g., logical storage space or devices). Storage devices 365 are configured as logical portions of one or more physical storage devices 380 (e.g., arrays of one or more storage disks or portions thereof). Maps 370 provide a mapping of storage devices 365 (e.g., logical volumes) to corresponding physical storage devices 380 (e.g., storage disks).

Each host entity 304 may be limited to accessing certain storage devices 365 in storage system resource 375-1 based at least in part on configuration settings of switch devices 344 of network 340.

Computer system 610 enables a storage area network administrator (e.g., user 108) to communicate over network 350 and remotely modify, manage, and configure storage area network 300. In one embodiment, computer system 610 enables collection of information associated with resources in the storage area network environment 300. As previously discussed, a respective user 108 initiates mapping function 140 for purposes of mapping the storage area network resources to appropriate type identifiers as previously discussed. After applying rules 118 to a known storage area network configuration, the SAN advisory process 106 (FIG. 1) can display storage area network violation messages 170 to user 108 indicating which resources are compatible or incompatible.

As discussed above, techniques herein are well suited for use in environments supporting automated mapping of resources. As discussed above, one such application for applying these techniques is a storage area network environment 100. However, it should be noted that application of the techniques herein is not limited to use in such applications.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present application. As such, the foregoing description of embodiments of the present application is not intended to be limiting. Rather, any limitations to the invention are presented in the following claims.

We claim:

1. A computer-implemented method in which a computer system initiates execution of software instructions stored in memory, the computer-implemented method comprising:
   receiving a collection of data associated with a resource in a storage area network environment, the collection of data comprising resource specific data collected from the resource, the resource being an unknown resource type that does not initially map to a known resource type based on the resource specific data;
   modifying the collection of data;
   identifying a specific identity of the resource based on utilization of the modified collection of data;
   maintaining a set of mapping information to include multiple entries, each entry enables a mapping between a unique grouping of data and a corresponding specific identity of a storage area network resource that produces at least a portion of the unique grouping of data when queried;
   in response to receiving the collection of data, and prior to modifying the collection of data, attempting to map the unknown resource type directly to a known resource type, associated with the storage area network environment, by searching a global map of resources;
   in response to receiving the collection of data, and prior to modifying the collection of data, attempting to map the unknown resource type directly to a known resource type, associated with the storage area network environment, based on a generated user mapping history of resources that are manually mapped in the storage area network environment;
   in response to attempting to map, failing to map the unknown resource directly to a known resource type;
   wherein modifying the collection of data includes, subsequent to failing to map, applying a set of exclude patterns that remove data identified as not useful for mapping resources, and applying a set of include patterns that prevent deletion of data identified as useful for mapping resources; and
   analyzing an arrangement of identified types of resources, according to a set of configuration rules to determine whether the arrangement is compatible for use in the storage area network environment Storing the specific identity of the resource in the set of mapping information.

2. The computer-implemented method as in claim 1, wherein receiving the collection of data associated with the resource includes communicating with the resource to obtain the collection of data from the resource, and receiving a character string of data originated by the resource, the character string including at least a portion of data reflecting a classification of the resource;
   wherein modifying the collection of data includes eliminating a portion of data in the collection of data to produce the modified collection of data; and
   the computer-implemented method further comprising:
      verifying whether the character string matches any entries in a set of mapping information to identify the specific identity associated with the resource.

3. The computer-implemented method as in claim 1 further comprising:
   maintaining a set of mapping information to include multiple entries, each of which enables a mapping between a unique grouping of data and a corresponding specific identity of a storage area network resource that produces at least a portion of the unique grouping of data when queried;
   comparing the collection of data with the set of mapping information to attempt to match the collection of data to a corresponding unique grouping of data in the set of mapping information in order to map the resource to the corresponding specific identity of the resource; and
   in response to checking whether the collection of data matches any unique groupings of data in the set of mapping information, failing to match the collection of data with an entry in the set of mapping information.

4. The computer-implemented method as in claim 1 further comprising:
   maintaining multiple filters for selectively applying to the collection of data to produce the modified collection of data; and
   wherein modifying the collection of data includes:
      detecting that a first portion of the collection of data matches a pattern associated with a first filter of the multiple filters;
      applying the first filter to remove a first data portion from the collection of data;
      detecting that a second portion of the collection of data matches a pattern associated with a second filter of the multiple filters;
      applying the second filter to remove a second data portion from the collection of data.

5. The computer-implemented method as in claim 1, wherein identifying the specific identity associated with the resource includes, via use of the modified collection of data, mapping the resource to a class including multiple possible specific identities of resources in which the resource may match but for which it is not specifically known which specific identity in the class the resource actually matches.

6. The computer-implemented method as in claim 1, wherein identifying the specific identity associated with the resource includes:
   initiating application of a reverse lookup function to the modified collection of data to identify the specific identity associated with the resource, application of the reverse lookup function including:
      identifying whether the modified collection of data matches a given pattern and, if so, applying a corresponding algorithm to attempt to match the resource to a qualified resource type that has been pre-tested for possible use in combination with other resources in the storage area network environment.

7. The computer-implemented method as in claim 2 further comprising:
   initiating application of a reverse lookup function to the modified collection of data to identify the specific identity associated with the resource, application of the reverse lookup function including verifying whether character string information associated with a known specific identity of a given storage area network resource matches any portion of the modified collection of data.

8. The computer-implemented method as in claim 2, wherein identifying the specific identity associated with the resource based on the modified collection of data includes:
   parsing the modified collection of data;
   matching a portion of the modified collection of data with a set of character string information associated with corresponding known vendor types to identify at least one vendor type associated with the resource; and
   the computer-implemented method further comprising:
      subsequent to matching, providing notification that the resource maps to each of at least two different vendor types.

9. The computer-implemented method as in claim 2, wherein identifying the type associated with the resource based on the modified collection of data includes:
   parsing the modified collection of data;
   matching a portion of the modified collection of data with a set of character string information associated with corresponding known model types of resources to identify at least one model type associated with the resource; and
   the computer-implemented method further comprising:
      subsequent to matching, providing notification that the resource maps to each of at least two different model types.

10. The computer-implemented method as in claim 2 further comprising:
    prior to modifying the collection of data, comparing the collection of data with a set of mapping information to identify a specific identity of the resource; and
    wherein modifying the collection of data occurs in response to failing to match the collection of data with an entry in the set of mapping information.

11. A computer program product including a computer-readable storage medium having instructions stored thereon for processing data information, such that the instructions, when carried out by a processing device, cause the processing device to perform the steps of:
    receiving a collection of data associated with a resource in a storage area network environment, the resource being unknown to a mapping process used in managing the storage area network environment, the collection of data containing configuration and settings information associated with the resource;
    modifying the collection of data;
    identifying the specific identity of the resource based on utilization of the modified collection of data;
    maintaining a set of mapping information to include multiple entries, each entry enables a mapping between a unique grouping of data and a corresponding specific identity of a storage area network resource that produces at least a portion of the unique grouping of data when queried;
    in response to receiving the collection of data, and prior to modifying the collection of data, attempting to map the unknown resource type directly to a known resource type, associated with the storage area network environment, by searching a global map of resources;
    in response to receiving the collection of data, and prior to modifying the collection of data, attempting to map the unknown resource type directly to a known resource type, associated with the storage area network environment, based on a generated user mapping history of resources that are manually mapped in the storage area network environment;
    in response to attempting to map, failing to map the unknown resource directly to a known resource type;
    wherein modifying the collection of data includes subsequent to failing to map, applying a set of exclude patterns that remove data identified as not useful for mapping resources and applying a set of include patterns that prevent deletion of data identified as useful for mapping resources; and
    analyzing an arrangement of identified types of resources according to a set of configuration rules to determine whether the arrangement is compatible for use in the storage area network environment Storing the specific identity of the resource in the set of mapping information.

12. A computer system comprising:
    a processor;
    a memory unit that stores instructions associated with an application executed by the processor; and
    an interconnect coupling the processor and the memory unit, enabling the computer system to execute the application and perform operations of:
       receiving a collection of data associated with a resource in a storage area network environment, the resource being unknown to a mapping process used in managing the storage area network environment, the collection of data containing configuration and settings information associated with the resource;
       modifying the collection of data;
       identifying the specific identity of the resource based on utilization of the modified collection of data;
       maintaining a set of mapping information to include multiple entries, each entry enables a mapping between a unique grouping of data and a corresponding specific identity of a storage area network resource that produces at least a portion of the unique grouping of data when queried;
       in response to receiving the collection of data, and prior to modifying the collection of data, attempting to map the unknown resource type directly to a known resource type, associated with the storage area network environment, by searching a global map of resources;
       in response to receiving the collection of data, and prior to modifying the collection of data, attempting to map the unknown resource type directly to a known resource type, associated with the storage area network environment, based on a generated user mapping history of resources that are manually mapped in the storage area network environment;
       in response to attempting to map, failing to map the unknown resource directly to a known resource type;
       wherein modifying the collection of data includes, subsequent to failing to map, applying a set of exclude patterns that remove data identified as not useful for mapping resources, and applying a set of include patterns that prevent deletion of data identified as useful for mapping resources; and
       analyzing an arrangement of identified types of resources according to a set of configuration rules to determine whether the arrangement is compatible for use in the storage area network environment Storing the specific identity of the resource in the set of mapping information.

13. The computer-implemented method of claim 1, wherein identifying the specific identity associated with the resource includes:

applying a reverse lookup process to the modified collection of data, to match the unknown resource with a known identity, when a resource under test, associated with the modified collection of data, is a host bus adapter driver;

applying a matching process to the modified collection of data, to match the unknown resource with a known identity, when the resource under test, associated with the modified collection of data, is an operating system;

applying a reverse lookup process to the modified collection of data, to match the unknown resource with a known identity, when the resource under test, associated with the modified collection of data, is switch firmware; and applying a matching process to the modified collection of data, to match the unknown resource with a known identity, when the resource under test, associated with the modified collection of data, is a storage array.

14. The computer-implemented method of claim 13 further comprising:
reverting back to an originally received character string from the collection of data in response to identifying empty data after modifying the collection of data by applying the set of exclude patterns.

15. The computer-implemented method of claim 13 further comprising:
in response to identifying an upgrade to resources, the upgrade invalidating a current mapping, changing the mapping to identify newly upgraded resources that are currently unknown to the mapping process.

16. The computer-implemented method as in claim 1 further comprising:
prior to modifying the collection of data, utilizing the resource specific data associated with the resource to attempt to match the resource to any of multiple known resource types;
wherein modifying the collection of data occurs in response to failing to match the resource to any of the multiple known resource types, the failing occurring because multiple different types of resources respond with the resource specific information when queried; and
wherein modifying the collection of data includes: applying a text-based filter pattern to the resource specific information collected from the resource to produce the modified collection of data, the text-based filter pattern indicating a portion of the resource specific information to include in the modified collection of data.

17. The computer-implemented method as in claim 16, wherein identifying the specific identity of the resource includes:
via use of the modified collection of data, mapping the resource to a class including multiple possible specific identities of resources in which the resource may match but for which it is not specifically known which specific identity in the class the resource actually matches.

18. The computer-implemented method as in claim 17, wherein identifying the specific identity of the resource includes:
initiating display of an entry in a listing, the entry including an identifier of the resource;
displaying the entry to include the multiple possible specific identities; and
receiving input from a user selecting one of the multiple possible specific identities as being the specific identity of the resource.

19. The computer-implemented method as in claim 18 further comprising:
initiating application of a reverse lookup function to the modified collection of data to identify the specific identity associated with the resource, application of the reverse lookup function including verifying whether character string information associated with a known specific identity of a given storage area network resource matches any portion of the modified collection of data;
initiating application of a matching service function to the modified collection of data, the matching service function matching portions of the collection of data to known vendor information to identify possible specific vendor types associated with the resource; and
generating the multiple possible specific identities based on results of applying the reverse lookup function and the matching service function to the modified collection of data.

* * * * *